(12) United States Patent
Bachmann et al.

(10) Patent No.: US 8,688,970 B2
(45) Date of Patent: Apr. 1, 2014

(54) ACCESS-NETWORK TO CORE-NETWORK TRUST RELATIONSHIP DETECTION FOR A MOBILE NODE

(75) Inventors: Jens Bachmann, Langen (DE); Kilian Weniger, Langen (DE); Takashi Aramaki, Kadoma (JP); Jon Schuringa, Langen (DE); Jun Hirano, Kadoma (JP); Shinkichi Ikeda, Kadoma (JP)

(73) Assignee: Panasonic Corporation, Osaka (JP)

( * ) Notice: Subject to any disclaimer, the term of this patent is extended or adjusted under 35 U.S.C. 154(b) by 575 days.

(21) Appl. No.: 12/665,006

(22) PCT Filed: Jun. 12, 2008

(86) PCT No.: PCT/EP2008/004731
§ 371 (c)(1),
(2), (4) Date: Jan. 28, 2010

(87) PCT Pub. No.: WO2008/155066
PCT Pub. Date: Dec. 24, 2008

(65) Prior Publication Data
US 2010/0199332 A1 Aug. 5, 2010

(30) Foreign Application Priority Data
Jun. 19, 2007 (EP) ..................................... 07011972
Apr. 28, 2008 (EP) ..................................... 08008131

(51) Int. Cl.
*H04L 29/06* (2006.01)
(52) U.S. Cl.
CPC ............ *H04L 63/164* (2013.01); *H04L 63/029* (2013.01)
USPC ........... 713/151; 713/152; 713/153; 713/154; 726/3; 726/4; 726/5; 726/6

(58) Field of Classification Search
CPC ............................ H04L 63/164; H04L 63/029
USPC ..................................................... 713/151, 168
See application file for complete search history.

(56) References Cited

U.S. PATENT DOCUMENTS

2006/0265737 A1 11/2006 Morris
2007/0006295 A1* 1/2007 Haverinen et al. .............. 726/14

OTHER PUBLICATIONS

3GPP TS 23.402 V.1.0.0—May 2007.*
International Search Report dated May 6, 2009.
European Search Report dated Dec. 12, 2007.
European Search Report dated Apr. 9, 2009.

(Continued)

*Primary Examiner* — Longbit Chai
(74) *Attorney, Agent, or Firm* — Dickinson Wright PLLC

(57) ABSTRACT

The invention provides a method for trust relationship detection between a core and access network for a user equipment. The gist is that a security tunnel establishment procedure is used so one entity, be it part of the core network or be it the user equipment itself, is provided with information to determine whether the access network is trusted or untrusted. The information may comprise a first IP address/prefix, which is initially assigned to the user equipment, upon attaching to the access network. The necessary information may further comprise a second IP address/prefix, which is an address/prefix that is allocated at a trusted entity of the core network. Depending which entity determines the trust relationship of the access network, it might be necessary to transmit either the first IP address/prefix or the second IP address/prefix or the first and the second IP address/prefix using the security tunnel establishment procedure.

16 Claims, 9 Drawing Sheets

(56) References Cited

OTHER PUBLICATIONS

3GPP TS 23.402 V1.0.0, "3rd Generation Partnership Project; Technical Specification Group Services and System Aspects; Architecture Enhancements for non-3GPP accesses (Release 8)," 3GPP Technical Specification, May 2007, pp. 1-50.

3GPP TS 124 229 V7.6.0, "Digital cellular telecommunications system (Phase 2+); Universal Mobile Telecommunications System (UMTS); Internet Protocol (IP) multimedia call control protocol based on Session Initiation Protocol (SIP) and Session Description Protocol (SDP); Stage 3," 3GPP TS 24.229 version 7.6.0 Release 7, ETSI, France, vol. 3-CN1, No. V7.6.0, Dec. 2006, pp. 1-403.

S. Vaarala, "Mobile IPv4 Traversal Across IPsec-based VPN Gateways," Internet Engineering Task Force Standard-Working Draft, IETF, draft-ietf-mobileip4-vpn-problem-solution-03.txt, Sep. 2003, pp. 1-49.

D. Johnson, et al. "Mobility Support in IPv6," Internet Engineering Task Force, IETF, RFC 3775, Jun. 2004, pp. 1-165.

H. Soliman, "Mobile IPv6 support for dual stack Hosts and Routers (DSMIPv6)," Internet Engineering Task Force Internet Draft, IETF, draft-ietf-mip6-nemo-v4traversal-04.txt, Mar. 2007, pp. 1-23.

S. Gundavelli, et al., "Proxy Mobile IPv6," Internet Engineering Task Force Internet Draft, draft-ietf- netlmm-proxymip6-00.txt, IETF, Apr. 2007, pp. 1-46.

R. Droms et al., "Dynamic Host Configuration Protocol for IPv6 (DHCPv6)," Internet Engineering Task Force Standard, IETF, RFC 3315, Jul. 2003, pp. 1-90.

\* cited by examiner

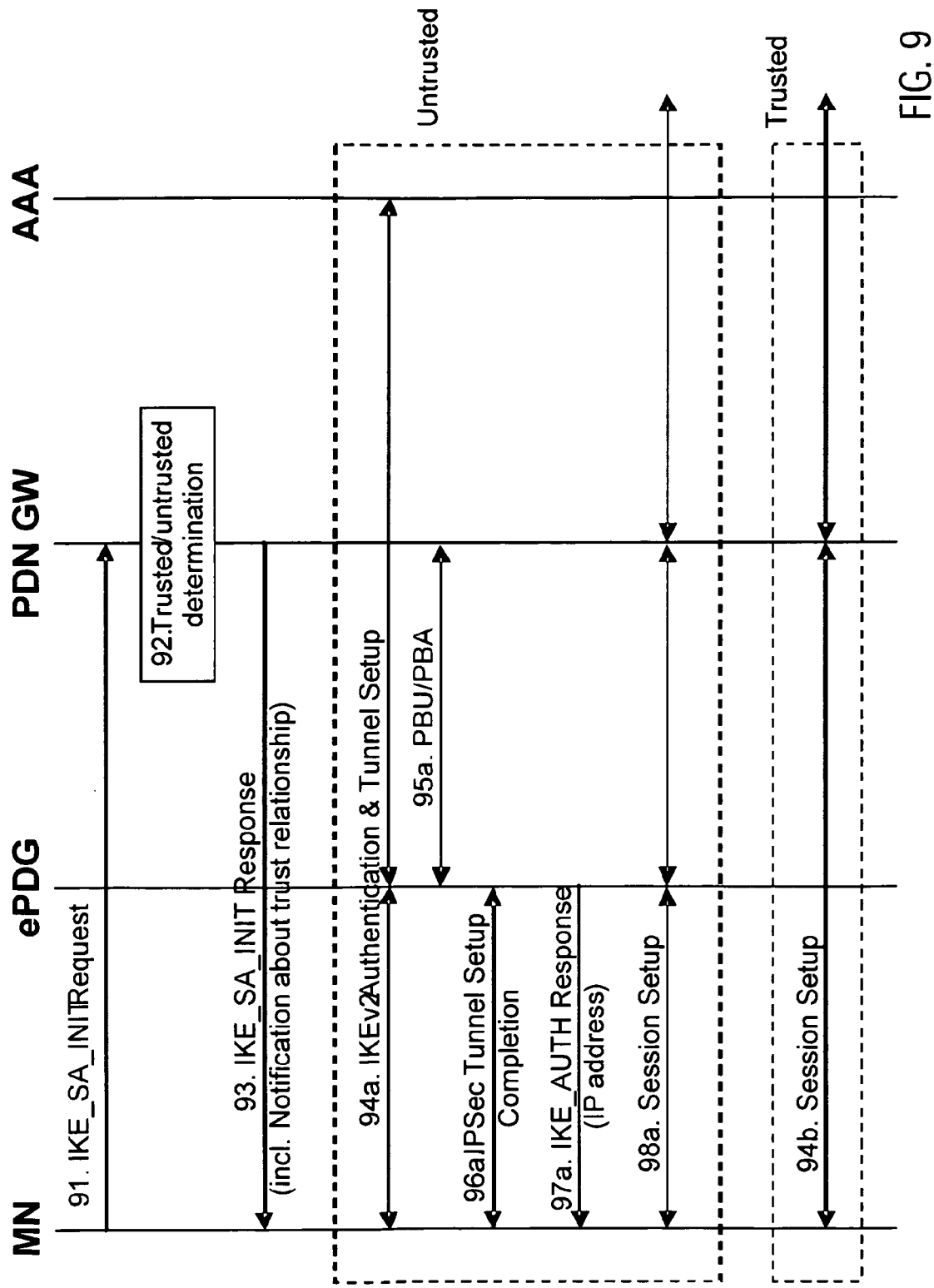

ACCESS-NETWORK TO CORE-NETWORK TRUST RELATIONSHIP DETECTION FOR A MOBILE NODE

FIELD OF THE INVENTION

The invention generally relates to mobile communications and in particular to mobility signalling after handover or after initial attach to a non-3GPP access network.

The invention concerns a method for trust relationship detection in a mobile network between a core network and a non-3GPP access network.

TECHNICAL BACKGROUND

In 3GPP the evolution of the system architecture is specified in the standards (3GPP TS 23.401 and 3GPP TS 23.402). One aspect of the evolution is the support of 3GPP (3rd Generation Partnership Project) access (e.g. GERAN (GSM/Edge Radio Access Network), UTRAN (UMTS Terrestrial Radio Access Network), E-UTRAN (Evolved-UTRAN)), non-3GPP accesses (e.g. WLAN (Wireless Local Area Network), WiMAX (Worldwide Interoperability for Microwave Access), 3GPP2 (3rd Generation Partnership Project 2), etc.) and also mobility between them. The anchor for the mobility between the 3GPP and the non-3GPP accesses is a Gateway in the 3GPP Core Network, that also provides the interface to the external Packet Data Network (PDN), and is called PDN GW. The mobility between 3GPP and non-3GPP accesses is based on Mobile IP, whereby the protocol used can be either Client Mobile IP (D. Johnson, C. Perkins, J. Arkko, "Mobility Support in IPv6", RFC 3775, June 2004; H. Soliman, "Mobile IPv6 support for dual stack Hosts and Routers (DSMIPv6)", draft-ietf-mip6-nemo-v4traversal-04.txt, March 2007) or Proxy Mobile IP (S. Gundavelli, K. Leung, V. Devarapalli, K. Chowdhury, B. Patil, "Proxy Mobile IPv6", draft-ietf-netlmm-proxymip6-00.txt, April 2007). The non-3GPP accesses are separated into trusted accesses and untrusted accesses. The assumption for untrusted accesses is, that a UE (User Equipment) in an untrusted access needs first a secure tunnel (based on IPsec (Internet Protocol Security)) to an evolved Packet Data Gateway (ePDG) before being able to access operator services. The ePDG is similar to the PDG used for Interworking WLAN (described in TS 23.234). On the other hand from trusted accesses this secure tunnel is not needed. Whether a non-3GPP access is trusted or not is an operator decision and may be different from operator to operator.

For mobility within the same or between different non-3GPP accesses similar mechanisms can be used as for mobility between 3GPP and non-3GPP accesses, i.e. Client or Proxy Mobile IP (Internet Protocol).

As described above, 2 different types of non-3GPP accesses are defined, i.e. untrusted non-3GPP access and trusted non-3GPP access, and whether a non-3GPP access is trusted or not is left to the 3GPP operator. Furthermore, a non-3GPP access may be a trusted access for one UE from an operator A and an untrusted access for another UE from operator A.

When the UE moves into or attaches initially in an untrusted non-3GPP access (FIG. 1), it has to discover an ePDG first, establish an IPsec Key Exchange IKEv2/IPsec tunnel with the ePDG and can connect to the Evolved Packet Core EPC (PDN GW) over the ePDG IPsec tunnel. On the other hand when the UE moves into or attaches initially in a trusted non-3GPP access (FIG. 2) it can connect directly to the EPC (PDN GW).

The problem is that during initial attach or after handover to non-3GPP access (FIG. 3), UE does not know whether the access is trusted or untrusted and if:
  a tunnel to ePDG should be established and then afterwards a BU message can be sent to PDN GW, or
  BU message can be sent to PDN GW directly.

As described above, a UE, starting connection establishment with a non-3GPP access network (after handover or with initial attach), may not know whether the non-3GPP access network is trusted or untrusted.

Several possible solutions exist regarding how the UE may detect the trust relationship of the non-3GPP access network. Some of the solutions are described in the following and also possible problems with these solutions are highlighted:

1. Some Radio Access Technologies (RATs) are trusted by default (WiMAX) and others are untrusted by default (WLAN 802.11). The problem with this solution is, that it may not be true, because it could be an operator's decision whether a RAT is trusted or not. Further it may depend on the UE capabilities whether a non-3GPP access is trusted for this UE or not, e.g. it could be trusted if the UE supports specific security means.
2. The UE is pre-configured with a list of network prefixes from trusted non-3GPP accesses. The problem here is that this list can get quite large, for example if an operator has trust relationships with a large number of small non-3GPP access hotspot operators. Furthermore, new non-3GPP access networks may join continually and thus the list must be kept up to date and this could be difficult or rather inefficient if there are a large number of UEs that must be updated.
3. The UE may be informed during AAA (Authentication, Authorisation and Accounting) procedures, e.g. by EAP (Extensible Authentication Protocol) extensions. This solution requires support from local non-3GPP access AAA protocols and infrastructure, however it can not be assumed that this is always supported.
4. The UE is informed by lower layer information (e.g. on L2). Also here the problem is, that it requires support from the non-3GPP access network, i.e. the lower layers (e.g. by some means provided by IEEE 802.11u or IEEE 802.21).
5. The UE tries to establish the connection to the PDN GW, i.e. sends a Binding Update directly to the PDN GW address (or to PDN GW and ePDG in parallel) and if the establishment to the PDN GW fails (because the PDN GW is not reachable from the untrusted non-3GPP access), the UE knows that it is in an untrusted non-3GPP access and the ePDG must be used. The Problem is that the UE must try several times to reach the PDN GW until it can reliable conclude that the PDN GW is not reachable, thus the procedure is very slow.
6. The UE always uses the ePDG first, i.e. establishes the tunnel to an ePDG, and if the non-3GPP access is trusted, the UE is informed to connect to the PDN GW directly. The problem with this solution is, that it consumes higher resources at the beginning, because all packets are double tunnelled (IPsec+MIP tunnel) and routed over the ePDG, thus it is not very efficient.
7. The UE may ask a DHCP server (R. Droms, J. Bound, B. Volz, T. Lemon, C. Perkins, M. Carney "Dynamic Host Configuration Protocol for IPv6 (DHCPv6)", RFC 3315, July 2003) if it is in a trusted or untrusted non-3GPP access. Here, at first the UE connects to the non-3GPP access and the L2 access is established. Then the UE requests a DHCP server about the trust relationship (including its identity, e.g. in form of a NAI, and/or also the user's home operator identifier). If the non-3GPP access is trusted for the user's home operator and for the user, the DHCP server informs the user about the trust relationship and may return in addition an IP address of the PDN GW. If the non-3GPP access is untrusted for the user's home operator and the user, the DHCP server informs the user about the trust relationship and may return in addition an IP address of the ePDG. Problem here is, that this solution requires a pre-configured entry in the local DHCP server or support by the AAA infrastructure, so that the DHCP server is updated with information for the UE during the access authentication of the UE. But if this is not available, DHCP may not be able to return a valid IP address. In this case the UE may use an ePDG per default. However, this process might be slow.

8. The UE may ask a DNS server if it is in a trusted or untrusted non-3GPP access. Here, at first the UE connects to the non-3GPP access and establishes L2 and L3 access. Then, the UE may construct an UE or operator specific FQDN (Fully Qualified Domain Name), e.g. for the service or PDN, for example as follows:

```
FQDN=<pdn>.<non-3gpp>.<hplmn>.3gppnetwork.orgor
FQDN= <pdn>.<user id>.<non-3gpp>.<hplmn>.3gppnetwork.org
```

Here the hplmn part is an identifier of the user's home operator, e.g. the MNC (Mobile Network Code) and MCC (Mobile Country Code) codes, the non-3GPP part is some information about the non-3GPP network, e.g. an advertised Network Access identifier or the advertised IP prefix, the user id part is an identifier of the user, e.g. a NAI (Network Access Identifier). The UE asks the DNS (Domain Name Server) system about this specific FQDN and the DNS request will be resolved recursively. If it can not be resolved by a previous DNS server, it will be finally resolved by the DNS server of the UE's home operator. If the non-3GPP access is untrusted, the DNS server will provide an ePDG together with an IP address. Then the UE should establish a tunnel to the ePDG and send the BU to the PDN GW over the tunnel. If the non-3GPP access is trusted, the DNS server will provide a PDN GW together with an IP address. Then the UE should send the BU to the PDN GW directly. Problem here could be that the resolution is quite slow.

SUMMARY OF THE INVENTION

The present invention has been made in consideration of the situation described above and has as its object to make mobility signalling after handover or after initial attach to a non-3GPP access network more efficient. A more detailed objection of the invention is to provide a method for the UE to easily determine whether the access network, to which it has attached, is trusted or not.

The object is solved by the subject-matter of the independent claims. Advantageous embodiments of the invention are subject-matters to the dependent claims.

According to various embodiments of the invention, a network based mobility scheme is used by the user equipment (UE), and it is assumed that an untrusted access network does not support the network based mobility scheme used by the UE. Thus, a UE would need to implement the network based mobility scheme with its local mobility anchor (which is a packet data network gateway (PDN-GW) in the core network responsible for the UE) via an evolved packet data gateway (ePDG) (which provides connectivity to untrusted access networks). In said respect, the UE needs to establish a security tunnel with the ePDG, via which the user data is then exchanged between the UE and the PDN-GW. For this to work, the UE needs to use for its communication its home IP address, allocated at the PDN-GW. Only in said case, when using said home IP address for session communication with other entities, the user data is indeed received by the PDN-GW and forwarded to the ePDG, and from there via the security tunnel to the UE. Then, also the network based mobility functions properly, and a session is not interrupted, when the UE moves to another access, because the home IP address, allocated at the PDN-GW, can be further used at the new access network.

Generally, when a user equipment attaches to a new access network, it gets at the beginning an IP address/prefix from the access network. If the access network is a trusted network, it supports the network based mobility scheme of the UE, and the access point of the access network functions as a proxy mobility agent for the local mobility anchor (PDN-GW), responsible for the mobility of the UE. The access point is able to contact the local mobility anchor of the UE and to receive the UE's home IP address/prefix therefrom, which it then signals to the UE. When receiving the home IP prefix, the UE shall use said home IP prefix for generating an home IP address, which the UE can use for session communication with other entities.

If the access network is an untrusted network, it does not support the network based mobility scheme of the UE. Therefore, the local mobility anchor (PDN-GW) cannot be reached by the access point of the access network. Consequently, an IP address/prefix, which is allocated locally at the access network, is generated and transmitted to the UE by the access point. In said case, it would be necessary for the UE to use the ePDG as proxy mobility agent for contacting the local mobility anchor (PDN-GW) and thereby implement network based mobility in the untrusted access network. In said case, the UE needs to establish a security tunnel to the ePDG, which in turn contacts the PDN-GW, to receive an home IP address/prefix of the UE, allocated at the PDN-GW. The ePDG forwards the received home IP address/prefix to the UE, which, in case of the IP prefix, uses the home IP prefix to generate an IP address for session communication with other entities. Then, again it is possible for the UE to maintain session continuity when changing accesses. In contrast thereto, provided that the locally allocated IP address/prefix would have been used by the UE for a session (e.g. when the UE falsely assumes that the untrusted access network is a trusted one, and thus the IP address/prefix is allocated at its own local mobility anchor), said session would be interrupted as soon as the UE leaves the access network.

From the point of the view of the UE, the above differentiation is transparent, i.e. the UE does not know whether the received IP address/prefix, is allocated at the PDN-GW (being its own home IP address/prefix), or locally in the access network.

Therefore, it is necessary for the UE to determine whether the access network is trusted, which means that the received IP address/prefix can be used for session establishment, or untrusted, which means that the received IP address/prefix cannot be used for session establishment but instead its network based mobility has to be implemented with the PDN-GW via the ePDG.

However, in case of handover when using a network based mobility scheme, the detection of whether the access is trusted or not can be achieved by comparing the IP address/prefix received in the old access network with the IP prefix received in the new access network. In more detail, provided that a UE performs a handover from an old access network to a new access network, the UE used an IP address for session communication at the old access network, which is its home IP address and is based on the home IP prefix allocated at the PDN-GW (the local mobility anchor of the UE). When the UE moves to the new access network, it receives an IP address/prefix from the new access network, which can either be the home IP address/prefix, allocated at the PDN-GW, or an IP address/prefix, allocated locally at the new access network. By comparing the old IP address/prefix, used at the old access network, with the new IP address/prefix, received from the new access network, the UE is able to infer whether the new received IP address/prefix is allocated at its local mobility anchor or not, and thus determine whether the access network is a trusted one or not.

The above easy way of determining the trust relationship between the new access network and the core network is not so easy when assuming the UE initially attaches to the new access network. In said case, no information about the old IP address/prefix is available since no session had been previously established by the UE. Thus, the UE cannot know whether the received IP address/prefix is its home IP address/prefix, allocated at the PDN-GW, or locally at the access network.

The present invention provides an easy and efficient way for the UE to determine in this and other cases, whether an access network is a trusted network or not.

The above-used term "IP address/prefix" means that either the IP address or the IP prefix can be used. When the UE gets an IP prefix, it generates therefrom an IP address, which can then be further applies for communication sessions. However, it is also possible that the UE directly gets an IP address, instead of an IP prefix. In said case, the UE receives, upon attaching to an untrusted access network, a locally allocated IP address, or gets a home IP address, allocated at the PDN-GW, from the trusted access network. It is of minor importance to the functioning of the invention whether the UE needs to generate an IP address out of an IP prefix, or whether the UE directly gets an IP address. A person skilled in the art is aware of said difference, and on the implications for the various embodiments of the invention which are to be explained later on. For the following, when the term "IP address" or the term "IP prefix" is used, it might still be possible that respectively the "IP prefix" or the "IP address" can be used instead, this being obvious to a person skilled in the art.

Furthermore, though most of the described embodiment assume network based mobility, the present invention is not restricted to network based mobility schemes and may also be applied to client based mobility schemes.

For instance, when using client based mobility, the UE also gets an IP address when attaching to a new access network, be it after a handover from an old access network or be it after an initial attach. Said IP address is locally allocated at the new access network. In order to implement the client based mobility, the UE needs to register the new IP address (Care of Address, when using MIP) with its home agent in the core network, so that the home agent can exchange data with the UE at the new access network.

However, in case the access network is not trusted by the core network, the registration attempt by the UE would not be accepted by the home agent. In said case, the UE must use the assigned IP address to contact an ePDG and to request a new IP address from the ePDG. Then, the newly assigned IP address, being allocated at the ePDG, can be successfully registered at the home agent of the UE in the core network, because this new IP address is allocated at the ePDG, which is part of the core network and thus trusted by the UE's home agent. It would also be necessary for the UE to establish a security tunnel to the ePDG. Resulting from the above, data is exchanged via the home agent of the UE, and via the ePDG to the UE attached to the untrusted access network.

In case the access network is trusted by the core network, the registration attempt with the UE's home agent is successful, and the initially received IP address can be used by the UE to start a communication session, as usual for client based mobility.

As just mentioned, the UE needs to know whether the access network, to which it has attached, is trusted or not by the core network, in order to know whether the initially received IP address can be used for communication or not.

The gist of the invention, on which the various embodiments of the invention are based, is that a security tunnel establishment procedure is used so that one specific entity, be it part of the core network or be it the user equipment itself, is provided with the necessary information to determine whether the access network is trusted or untrusted.

Messages of the security tunnel establishment procedure are employed to provide the entity, performing said determination, with the necessary information. The necessary information may comprise a first IP address/prefix, which is initially assigned to the user equipment by the access network, upon attaching to the access network. The necessary information may further comprise a home IP address/prefix of the user equipment, which is an IP address/prefix that is allocated at the UE's home agent in the core network.

Depending which entity determines the trust relationship of the access network, it might already know part of the necessary information, i.e. the first or the home IP address/prefix. Accordingly, the entity needs to be provided with the remaining necessary information from other entities, holding said missing information.

In other words, depending on which entity determines the trust relationship of the access network, it might be necessary to transmit either the first IP address/prefix or the home IP address/prefix or the first and the home IP address/prefix within messages of the security tunnel establishment procedure. For instance, provided the UE is the entity, determining the trust relationship of the access network, the first IP address/prefix is not to be transferred within the messages of the security tunnel establishment procedure, since the UE already knows the first IP address/prefix. However, in said case, the home IP address/prefix needs to be transferred to the UE using messages of the security tunnel establishment procedure.

Accordingly, in case the local mobility anchor, the PDN-GW, is the entity, determining the trust relationship of the access network, there is no need to exchange the home IP address/prefix during the security tunnel establishment procedure, because the home IP address/prefix is typically already known to the PDN-GW. However, the first IP address/prefix needs to be transferred to the PDN-GW, which can be done using one of the messages of the security tunnel establishment procedure.

In case of the ePDG determining the trust relationship of the access network, the first as well as the home IP address/prefix are to be provided to the ePDG, since the ePDG knows neither the first nor the home IP address/prefix. The ePDG can be provided with the first and the home IP address/prefix using messages of the security tunnel establishment procedure, and also using messages that are, though not being actually part of the security tunnel establishment procedure, triggered by the security tunnel establishment procedure.

Based on said information, the entity may determine whether the access network is trusted or not by the core network. This may be done by comparing the first IP address/prefix with the home IP address/prefix, and in case they coincide, it can be inferred that the access network is a trusted one. In said case, the access network had obtained the IP address/prefix from the trusted entity, and then had provided said obtained IP address/IP prefix, as the first IP address/prefix, to the UE upon the UE's attachment to the access network.

Otherwise, when the responsible entity determines that the first IP address and the home IP address do not coincide, the IP prefix received by the UE from the access network is allocated locally and thus shall not be used by the UE to start a communication session; the access network is not trusted by the core network. Therefore, it would be necessary to communicate with the core network, i.e. the local mobility anchor of the mobile node (PDN-GW), via an ePDG bridging from the untrusted access network to the core network.

According to an advantageous embodiment of the invention, the security tunnel establishment procedure comprises an authentication procedure, performed between the user equipment, the first gateway and an authentication server of the core network. In said case, the first gateway receives the home IP address/prefix from the authentication server in a message of the authentication procedure. This can expedite the whole determination, since the authentication procedure is usually performed at the beginning, and thus the first gateway receives quite early the information on the home IP address/prefix. Then, either the first gateway can determine, whether the access network is trusted or not, or can provide the entity, responsible for the determination, with the information on the home IP address/prefix.

In a further embodiment of the invention, in case the first gateway determines whether or not the access network is trusted by the core network, the result of the determination is transferred to the user equipment within a message of the security tunnel establishment procedure.

Referring now to another advantageous embodiment of the invention, the first gateway is an evolved packet data gateway, and the trusted entity is a packet data network gateway responsible for the user equipment. The home IP address/prefix is transferred from the packet data network gateway to the user equipment, within one of the messages of the security tunnel establishment procedure, and/or to the evolved packet data gateway, within another message triggered by the security tunnel establishment procedure.

According to a further advantageous embodiment of the invention, the first IP address/prefix is transferred from the user equipment to the evolved packet data gateway within one of the messages of the security tunnel establishment procedure. This is done in case the user equipment does not perform the determination of the access network's trust relationship with the core network.

In a further embodiment of the invention, the security tunnel establishment procedure triggers transmitting a mobility message from the evolved packet data gateway to the packet data network gateway, wherein the mobility message triggers the packet data network gateway to return the home IP address/prefix to the evolved packet data gateway.

Referring to a different embodiment of the invention, the mobility message, transmitted to the packet data network gateway, includes the first IP address/prefix, and wherein the packet data network gateway determines whether the IP address/prefix, received in the mobility message, has already been assigned to the user equipment by the packet data network gateway. In case it is determined that the IP address/prefix, received in the mobility message, is the same as the first IP address/prefix, assigned to the user equipment upon the user equipment attaching to the access network, the packet data network gateway returns information to the evolved packet data gateway on the result of said determination. In case it is determined that the IP address/prefix, received in the mobility message, was not assigned to the user equipment by the packet data network gateway upon the user equipment attaching to the access network, the home IP address/prefix is generated by the packet data network gateway and is transmitted to the evolved packet data gateway.

According to another advantageous embodiment of the invention, the first gateway and the trusted entity is a packet data network gateway responsible for the user equipment. Then, either the home IP address/prefix is transferred from the packet data network gateway to the user equipment within one of the messages of the security tunnel establishment procedure, or the first IP address/prefix is transferred from the user equipment to the packet data network gateway within one of the messages of the security tunnel establishment procedure. This depends on which entity actually performs the trust relationship determination.

An alternative embodiment of the invention provides a method for determining the trust relationship between a core network and an access network for a user equipment, attached to the access network. The core network comprises a packet data network gateway. An initiation message is transmitted from the user equipment to the packet data network gateway. In case no reply is received from the packet data network gateway in response to an initiation message, the user equipment determines that the access network is not trusted by the core network.

According to the alternative embodiment of the invention, the initiation message initiates a security tunnel establishment procedure between the user equipment and the packet data network gateway.

The invention also provides a user equipment attached to an access network, wherein a trust relationship between a core network, comprising a first gateway, and the access network is determined. A receiver of the user equipment receives a first IP address/prefix, assigned to the user equipment by the access network. The receiver and a transmitter of the user equipment exchange messages of a security tunnel establishment procedure, performed between the user equipment and the first gateway. The messages include information on the first IP address/prefix and/or a home IP address/prefix of the user equipment. A processor in the user equipment determines whether or not the access network is trusted by the core network, based on the first IP address/prefix and on the home IP address/prefix.

It should be obvious for a skilled person that the user equipment is further equipped with means to perform and/or participate in the steps of the previously explained embodiments of the invention.

The invention further provides a gateway in a core network, wherein a trust relationship between the core network and an access network is determined for a user equipment, attached to the access network. A receiver and transmitter of the gateway exchange messages of a security tunnel establishment procedure, performed between the user equipment and the gateway. The messages include information on a first IP address/prefix, received by the user equipment upon attaching to the access network, and assigned to the user equipment by the access network. The messages further include information on a home IP address/prefix of the user equipment. A processor in the gateway determine whether or not the access network is trusted by the core network, based on the first IP address/prefix and on the home IP address/prefix.

It should be obvious for a skilled person that the gateway is further equipped with means to perform and/or participate in the steps of the previously explained embodiments of the invention.

According to a first aspect a method, gateway, user equipment, network and computer-readable medium are provided for trust relationship detection between a core network and an access network for a user equipment connected to the access network, wherein the core network comprises a first gateway and a second gateway. The method comprises the steps of sending by the user equipment a message to the core network via the second gateway. It is then decided whether the user equipment resides in a trusted or a non-trusted access network. The first gateway sends a message to the user equipment via a tunnel between the first gateway and the user equipment, the tunnel being tunnelled between the second gateway and the user equipment if the user equipment resides in a non-trusted access network, and the first gateway sends a message to the user equipment via a tunnel between the first gateway and the user equipment if the user equipment resides in a trusted access network.

Referring now in more detail to the first aspect, the first gateway is a packet data network gateway and the second gateway is an evolved packet data gateway. The step of deciding is carried out by the second gateway or the first gateway or an authentication, authorization and accounting server. According to the first aspect, the message in the sending step is a binding update, wherein the binding update is tunnelled or included in another message. Further comprised is the step of sending by the first gateway a binding acknowledgement message to the user equipment at an internet protocol address in the non-3GPP access network if the user equipment resides in a trusted access network. According to the first aspect, the step of sending by the first gateway a binding acknowledgement message to the user equipment at an internet protocol address at the second gateway if the user equipment resides in a non-trusted access network is comprised. In the first aspect the internet protocol address at the second gateway is preconfigured or dynamically determined. The first aspect further comprises the steps of receiving by the user equipment the binding acknowledgement message; determining that the user equipment resides in a trusted network if the internet protocol address in the non-3GPP access network is used; and determining that the user equipment resides in a non-trusted network if the internet protocol address at the second gateway is used.

According to the first aspect, a network is provided wherein a trust relationship between a core network and an access network is detected for a user equipment. The core network comprises a first gateway and a second gateway. The user equipment sends a message to the core network via the second gateway. The core network decides whether the user equipment resides in a trusted or a non-trusted access network. Further, the first gateway sends a message to the user equipment via a first tunnel between the first gateway and the user equipment, the tunnel being tunnelled between the second gateway and the user equipment if the user equipment resides in a non-trusted access network. In contrast thereto, the first gateway send a message to the user equipment via a second tunnel between the first gateway and the user equipment if the user equipment resides in a trusted access network.

The first aspect further provides a gateway in a core network, wherein a trust relationship between the core network and an access network is detected for a user equipment connected to the access network. The gateway comprises reception means for receiving a message from the user equipment. Decision means in the gateway decide whether the user equipment resides in a trusted or non-trusted access network. Transmission means of the gateway send a message to the user equipment via a first tunnel between the gateway and the user equipment, the tunnel being tunnelled between another gateway and the user equipment if the user equipment resides in a non-trusted access network. Transmission means of the gateway send a message to the user equipment via a second tunnel between the gateway and the user equipment if the user equipment resides in a trusted access network.

The first aspect alternatively provides a gateway in a core network, wherein a trust relationship between the core network and an access network is detected for a user equipment connected to the access network. The gateway comprises reception means for receiving a message from the user equipment. Decision means in the gateway decide whether the user equipment resides in a trusted or non-trusted access network. Communication means of the gateway carry a message between another gateway and the user equipment if the user equipment resides in a non-trusted access network.

The first aspect provides in addition a user equipment connected to an access network, wherein a trust relationship between a core network, comprising a first and second gateway, and the access network is detected. The user equipment comprises transmission means for sending a message to the core network via the second gateway. Reception means of the user equipment receive a message from the first gateway via a first tunnel between the first gateway and the user equipment, the tunnel being tunnelled between the second gateway and the user equipment if the user equipment resides in a non-trusted access network. The reception means alternatively receive a message from the first gateway via a second tunnel between the first gateway and the user equipment if the user equipment resides in a trusted access network.

BRIEF DESCRIPTION OF THE FIGURES

Further features and advantages will become apparent from the following, and more particular description of the various embodiments of the invention as illustrated in the accompanying drawings, wherein:

FIG. 9 shows an exemplary signalling flow, in which the mobile node performs the IKE-security association exchange with the PDN-GW, and the PDN-GW decides on whether the access network is trusted or untrusted, according to still another embodiment of the invention.

DETAILED DESCRIPTION

Figure 1:
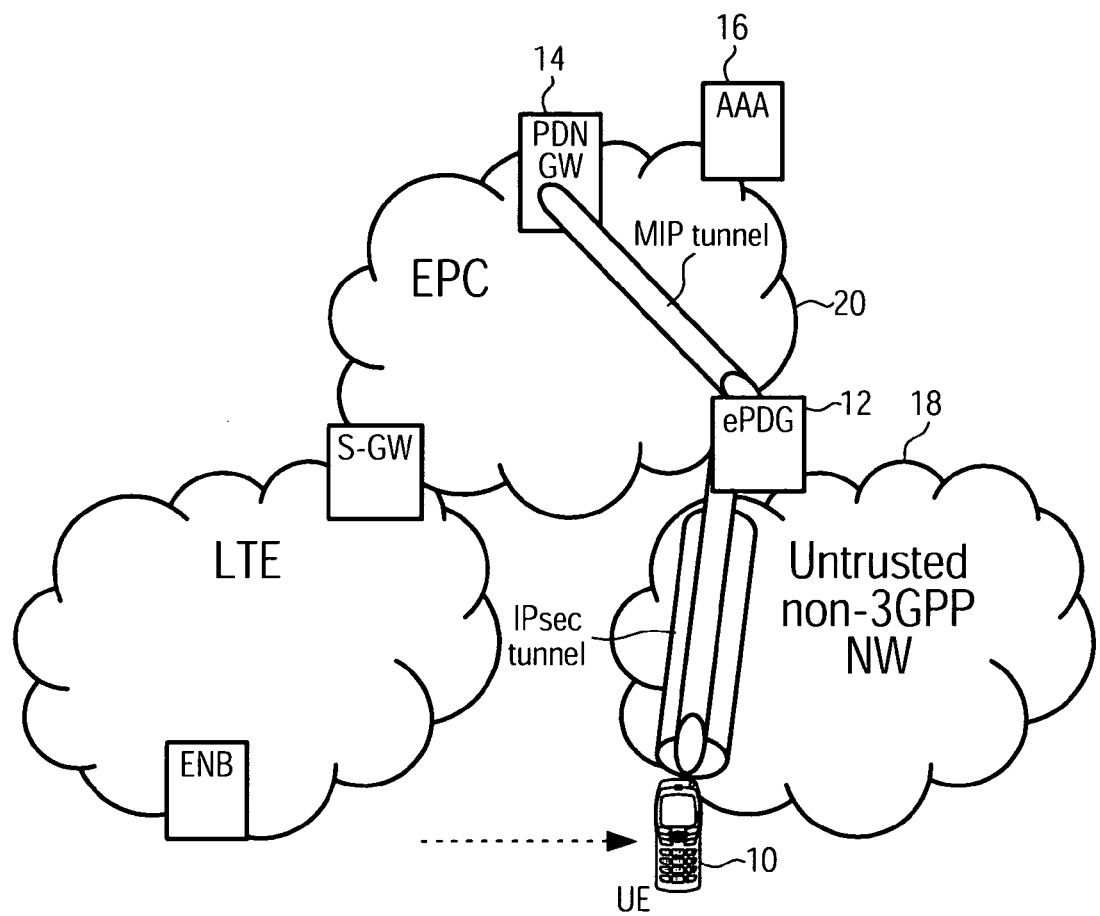
FIG. 1 shows an UE moving from 3GPP to an untrusted non-3GPP access network.
Figure 2:
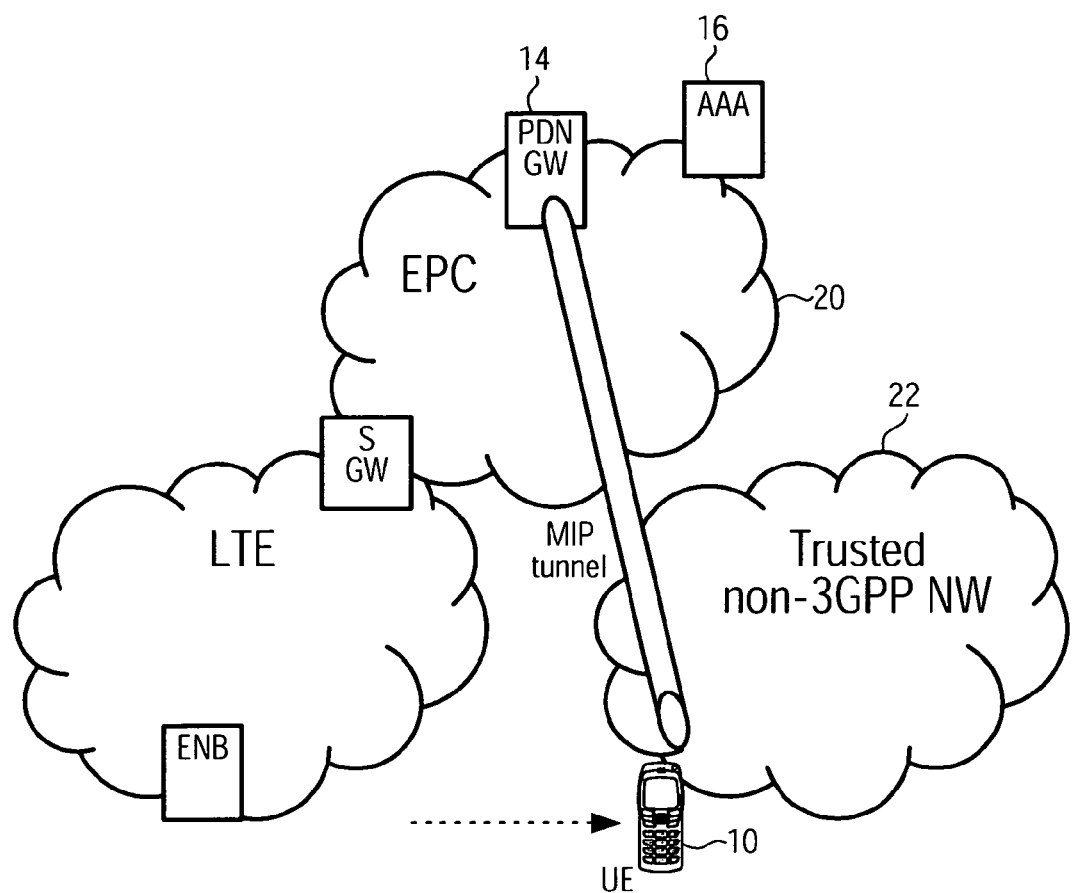
FIG. 2 depicts the UE moving from 3GPP to a trusted non-3GPP access network.

The following paragraphs will describe various embodiments of the invention including the detection of a trust relationship between a 3GPP core network and a non-3GPP access network, and illustrates further alternative configurations.

For exemplary purposes only most of the embodiments are outlined in relation to a 3GPP communications system, and the terminology used in the subsequent sections mainly relates to 3GPP terminology. However, the terminology used and the description of the embodiments with respect to a 3GPP architecture are not intended to limit the principles and ideas of the inventions of such systems.

Also the detailed explanations given in the technical background section above are merely intended to better understand the mostly 3GPP specific exemplary embodiments described in the following, and should not be understood as limiting the invention to the described specific implementations of processors and functions in the mobile communications network.

First Aspect

According to a first aspect a method is presented that allows a UE after a handover or after initially attaching to a non-3GPP access to detect whether the non-3GPP access is trusted or untrusted from the home operator point of view and, in this respect, to detect which tunnel to the home network to use.

In order to detect the trust relationship, the UE 10 signals mobility related messages to an ePDG 12 and the ePDG 12 forwards the message to the PDN GW 14. The ePDG 12 or the PDN GW 14 may decide or determine during the processing of the message whether the UE 10 is in a trusted 20 or untrusted 18 non-3GPP access network. If the UE 10 is in an untrusted non-3GPP access network 18, the PDN GW 14 sends a mobility message back to the UE 10 over the ePDG 12. On the other hand, if the UE 10 is in a trusted non-3GPP access network 20, the PDN GW 14 sends a mobility message back to the UE 10 directly.

In dependence on the destination of the mobility message from the PDN GW 14, the UE 10 can detect whether it is a trusted 20 or untrusted 18 non-3GPP access.

A UE 10 in a non-3GPP access network is allocated an IP address, which is known to the UE 10. In an untrusted access network 18 another address is needed for the UE 10, which is allocated by the ePDG 12 and made known to the UE 10. This is the remote address.

The UE 10 tunnels a Binding Update (BU), with destination PDN GW 14, to an ePDG 12. Then the ePDG 12 may decide or determine whether the UE 10 is in a trusted 20 or untrusted 18 non-3GPP access network and sends a BU to the PDN GW 14 or the ePDG 12 forwards the BU to the PDN GW 14 and the PDN GW 14 may decide or determine whether the UE 10 is in a trusted 20 or untrusted 18 non-3GPP access network. If the UE 10 is in a trusted non-3GPP access network 20, the PDN GW 14 sends a BACK (Binding ACKnowledgement) to the UE's IP address allocated in the non-3GPP access. If the UE 10 is in an untrusted non-3GPP access network 18 the PDN GW 14 sends a BACK to the UE's IP address allocated at the ePDG (UE's remote IP address). In dependence on the destination address that is used in the BACK the UE 10 can detect whether it is a trusted 20 or untrusted 18 non-3GPP access.

In the context of this invention it is understood that sending messages using a type 2 routing header or a home address option are considered as being tunnelled.

Some of the benefits of the above described methods are that it allows a dynamic per UE trust/untrusted decision, that no pre-configuration is required, no lower layer or non-3GPP access support is needed, that initial double tunnelling (IPsec+MIP tunnelling) is avoided in case the UE is in a trusted non-3GPP access and it is faster than a mechanism where the UE detects the trusted/untrusted relationship e.g. via DHCP/DNS.

Figure 3:
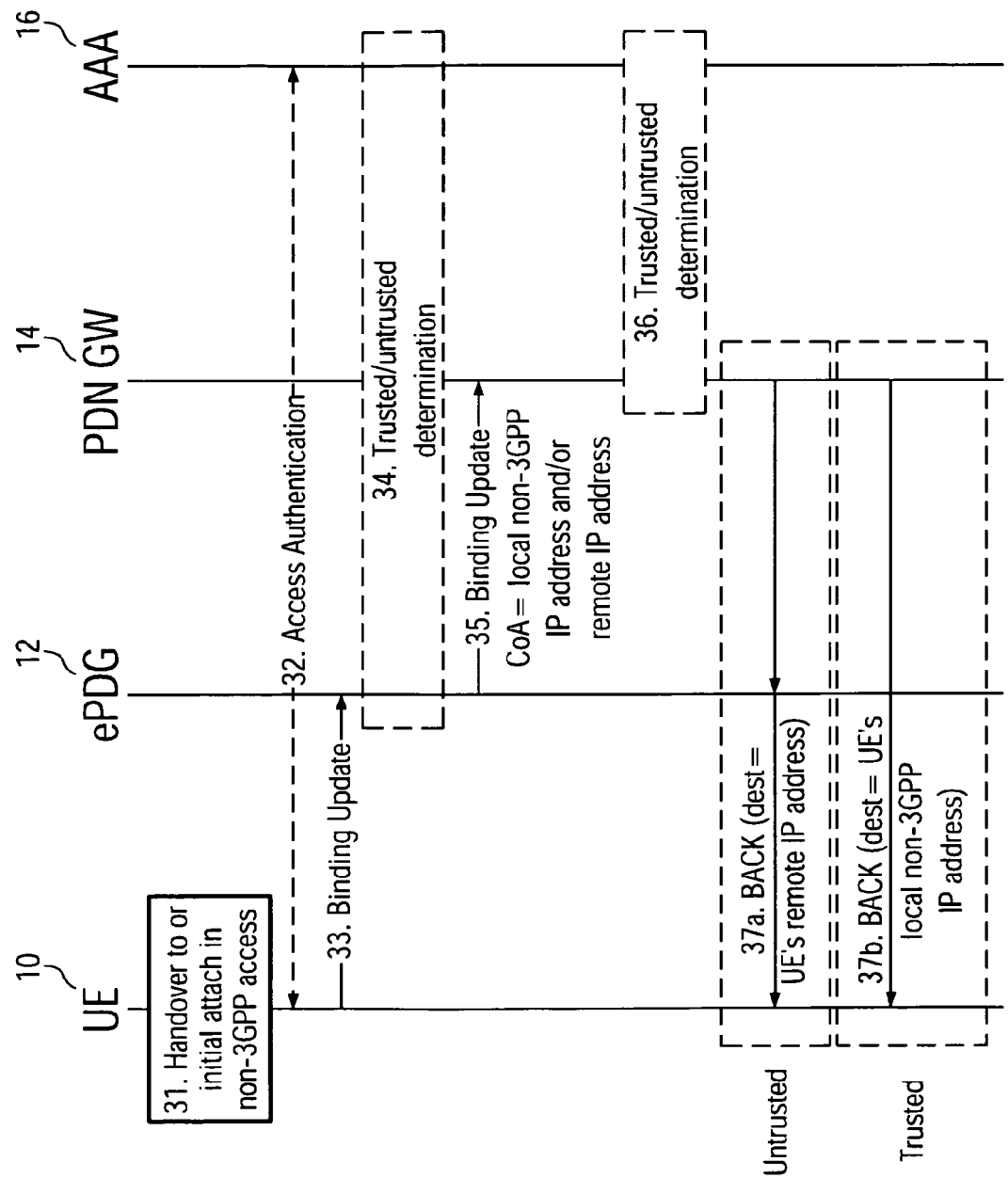
FIG. 3 is a high-level signalling flow for access to home network trust relationship detection.

In order to detect the trust relationship between the non-3GPP access and the home operator the following high-level signalling procedure shown in FIG. 3 is performed:

31. The UE performs a handover to a non-3GPP access network or initially attaches in a non-3GPP access. The UE does not know whether the non-3GPP access is trusted or not.

32. The UE may perform non-3GPP access authentication, involving the 3GPP AAA server as well.

Figure 4:
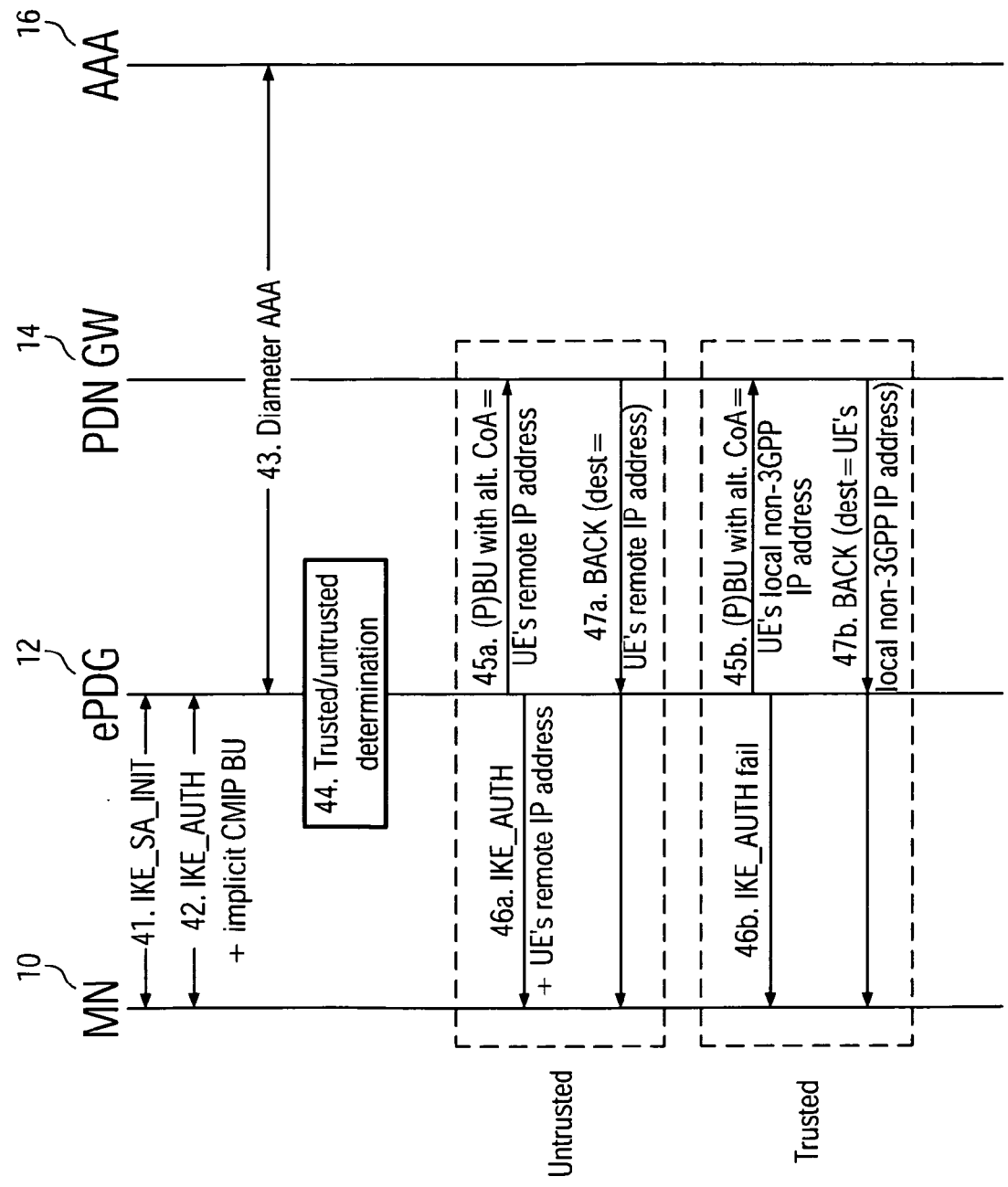
FIG. 4 shows an exemplary signalling flow with implicit BU and ePDG involvement.

33. The UE sends a Binding Update. The final destination of the BU is actually the PDN GW, but it is first sent to the ePDG. In order to let the ePDG receive the BU, it is either tunnelled from the UE to the ePDG or included in another message sent to the ePDG (e.g. an IKEv2 FIG. 4 message). The IP address of the ePDG may be pre-configured or dynamically determined, e.g. via DHCP or DNS or anycast.

34. The ePDG may determine the trust relationship between the non-3GPP access and the home operator based on information about the non-3GPP access transferred with the Binding Update and/or information received from the AAA server and/or information received from the PDN GW. If the AAA server is involved in the determination (e.g. ePDG asks AAA server during authenticating the UE or in a separate signalling exchange), the AAA server may determine the trust relationship between the non-3GPP access and the home operator based on information about the non-3GPP access transferred during access authentication and/or information about the non-3GPP access transferred with the Binding Update and provided by the ePDG (e.g. an Access Network identifier) and/or information in a subscriber database. The AAA server may send a notification to the ePDG (e.g. PDN GW sends a response during authenticating the UE). With the notification the ePDG may be informed whether the UE is in a trusted or untrusted non-3GPP access.

35. If the ePDG is involved in the determination of the trust relationship it may modify the BU or generate a new BU and send this BU to the PDN GW. For example if the ePDG determines that the UE is in a trusted non-3GPP access, it may send a BU with Care-of Address=UE's local non-3GPP IP address to the PDN GW and if the ePDG determines on the other hand, that the UE is in a untrusted non-3GPP access, it may send a BU with Care-of Address=UE's remote IP address to the PDN GW. If the ePDG is not involved in the determination of the trust relationship, it may forward the BU to the PDN GW without any other processing.

36. The PDN GW may determine the trust relationship between the non-3GPP access and the home operator based on information about the non-3GPP access transferred with the Binding Update and/or information received from the AAA server.

37. a. If the UE is in an untrusted non-3GPP access, the PDN GW sends the Binding Acknowledge (BACK) to the UE's remote IP address. I.e. the BACK is received first by the ePDG and tunnelled from the ePDG to the UE. Based on the destination IP address used in the BACK, the UE is able to detect that it is located in an untrusted non-3GPP access network and that all traffic to the PDN GW has to be tunnelled over the ePDG.

b. If the UE is in a trusted non-3GPP access, the PDN GW sends the Binding Acknowledge (BACK) to the UE's local non-3GPP IP address. I.e. the BACK is sent directly to the UE without going over the ePDG. Based on the destination IP address used in the BACK, the UE is able to detect that it is located in a trusted non-3GPP access network and that all traffic can be sent to the PDN GW directly.

In this section an exemplary signalling flow is shown (see FIG. 4), where the BU is not sent in a separate message, but is included in an IKEv2 message. The ePDG is able to detect this implicit BU and initiates appropriate measures as described in further detail below.

41. After handover or with initial attach to a non-3GPP access network the UE starts IKEv2 tunnel establishment with the ePDG, i.e. it sends an IKE_SA_INIT message to the ePDG and the ePDG responds with an IKE_SA_INIT message. After that the Diffie-Hellman exchange is completed and all subsequent messages can be encrypted and integrity protected. The IP address of the ePDG may be pre-configured or dynamically determined, e.g. via DHCP or DNS or anycast.

42. The UE starts with the IKE_AUTH exchange to authenticate itself and additionally the UE may request a remote IP address in a Configuration Payload if not yet already allocated.

The authentication can be based for example on EAP or in order to reduce the number of message exchanges on an extension like the EAP Reauthentication Extension (ERX). With ERX the UE uses a re-authentication Integrity Key to authenticate, thus an earlier authentication is required here. In the IKE_AUTH message an additional flag may indicate that the UE wants to perform a Binding Update with the PDN GW. Furthermore the sequence number for the BU should be included (and also a timestamp may be included), e.g. to avoid race conditions.

Another possibility for faster authentication (instead of using ERX) and sending an implicit BU is to include the BU (completely or partly) in the IDi field of the IKE_AUTH message. The IDi message is a variable length field and used for identification of the initiator. In this case the initiator is identified e.g. by its MN-NAI that is included in the BU. The BU can be authenticated with the Authentication Protocol for Mobile IPv6, i.e. a MN-AAA Security Association is used.

43. The ePDG contacts the AAA server to authenticate the UE using for example ERX or using the mechanism from the MIP6 authentication protocol.

44. After the ePDG has authenticated the UE, it can determine whether the UE is in a trusted or untrusted non-3GPP access (e.g. based on the UE's source IP address in the IKEv2 messages or on information from the AAA server or on an Access Network identifier in the IKE_AUTH message).

45.
   a. If the UE is in an untrusted non-3GPP access network, the ePDG may allocate a remote IP address for the UE and sends a BU with CoA=UE's remote IP address to the PDN GW.
      If ERX with the BU flag was used, the ePDG may send a Proxy Binding Update to the PDN GW, use the Alternative Care-of Address mobility option and set the Alt. CoA option to the UE's remote IP address.
      If the included BU with MIP6 Authentication Protocol was used, the ePDG can send and integrity protect a BU as sent from the UE, because it has received the keys for the MN-HA Security Association during the authentication. But in order not to forge the UE's IP address, it may also use the Alt. CoA option in this case and set it to the UE's remote IP address.
   b. If the UE is in a trusted non-3GPP access network, the ePDG sends a BU with CoA=UE's local non-3GPP IP address to the PDN GW. Here, the ePDG may not allocate a remote IP address.
      If ERX with the BU flag was used, the ePDG may send a Proxy Binding Update to the PDN GW, use the Alternative Care-of Address mobility option and set the Alt. CoA option to the UE's local non-3GPP IP address.
      If the included BU with MIP6 Authentication Protocol was used, the ePDG can send and integrity protect a BU as sent from the UE, because it has received the keys for the MN-HA Security Association during the authentication. But in order not to forge the UE's IP address, it may also use the Alt. CoA option in this case and set it to the UE's local non-3GPP IP address.

46.
   a. If the UE is in an untrusted non-3GPP access network, the ePDG informs the UE about the successful authentication in the IKE_AUTH message and may also inform the UE about the remote IP address in a Configuration Payload.
   b. If the UE is in a trusted non-3GPP access network, the ePDG may inform the UE in the IKE_AUTH message that the authentication has failed.

47.
   a. If the UE is in an untrusted non-3GPP access network, the PDN GW sends the Binding Acknowledge (BACK) to the UE's remote IP address. I.e. the BACK is at first received by the ePDG and tunnelled from the ePDG to the UE. In case the MIP6 Authentication Protocol was used to authenticate the BU, then the MIP6 Authentication Protocol is also used to authenticate the BACK. Based on the destination IP address used in the BACK, the UE is able to detect that it is located in an untrusted non-3GPP access network and that all traffic to the PDN GW has to be tunnelled over the ePDG.
   b. If the UE is in a trusted non-3GPP access network, the PDN GW sends the Binding Acknowledge (BACK) to the UE's local non-3GPP IP address. I.e. the BACK is sent to the UE directly, not over the UE-ePDG tunnel. In case the MIP6 Authentication Protocol was used to authenticate the BU, then the MIP6 Authentication Protocol is also used to authenticate the BACK. Based on the destination IP address used in the BACK, the UE is able to detect that it is located in a trusted non-3GPP access network and that all traffic can be sent to the PDN GW directly.

Figure 5:
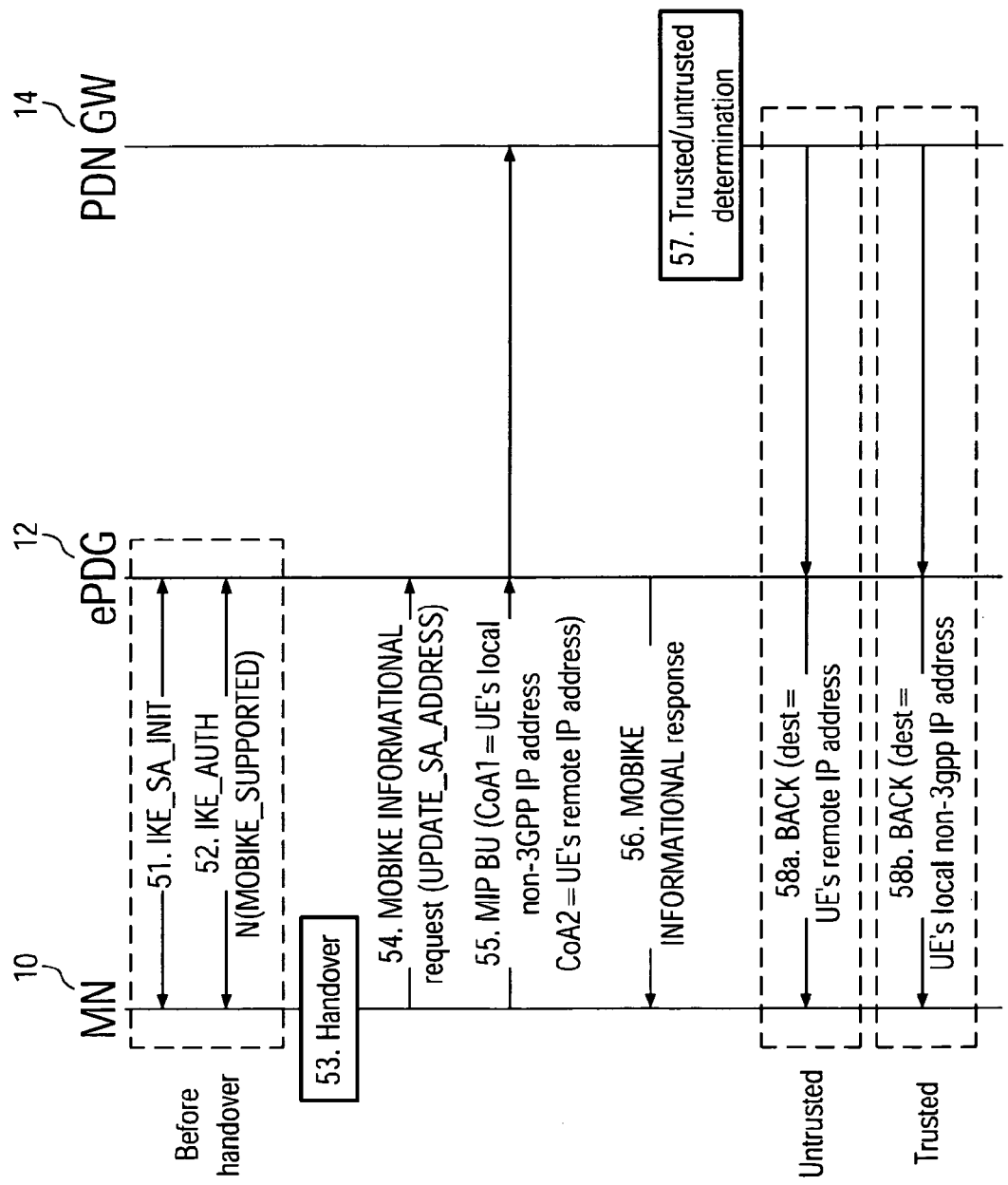
FIG. 5 is an exemplary signalling flow with separate BU and without ePDG involvement.

In this section an exemplary signalling flow is shown (see FIG. 5), where the BU is sent in a separate message but without significant delay. Furthermore, the trusted/untrusted determination can be transparent to the ePDG.

51. The UE starts IKEv2 tunnel establishment with the ePDG, i.e. it sends an IKE_SA_INIT message to the ePDG and the ePDG responds with an IKE_SA_INIT message. After that the Diffie-Hellman exchange is completed and all subsequent messages can be encrypted and integrity protected. The IP address of the ePDG may be pre-configured or dynamically determined, e.g. via DHCP or DNS or anycast.

52. The UE performs authentication with the ePDG using MOBIKE based on IKEv2, i.e. the UE sends a notification to the ePDG that it supports MOBIKE. Furthermore, the UE may request a remote IP address in a Configuration Payload, if not yet already allocated.
   Note: The steps 51 and 52 may be performed already before an actual handover.

53. The UE performs a handover to a non-3GPP access network and does not know, whether the non-3GPP access is trusted or untrusted.
54. The UE sends a MOBIKE INFORMATIONAL request to update the IPsec Security Association with the ePDG. Because MOBIKE is used, it is not necessary to create completely new IKE and IPsec SAs.
55. Immediately after the MOBIKE update the UE sends a Binding Update to the PDN GW over the UE-ePDG tunnel. In the BU the UE includes several Care-of Addresses, namely the UE's local non-3GPP IP address and the UE's remote IP address. To include several CoAs, the UE may use for example the Alternate Care-of Address option or an extension as proposed in the IETF WG MONAMI6.
56. The ePDG informs the UE that the SA update was successful.
Note: The step 56 may be performed before step 55.
57. The PDN GW determines whether the UE is in a trusted or untrusted non-3GPP access (e.g. based on the UE's local non-3GPP IP address in the BU messages or on information obtained from the AAA server or on additional information in the BU, like an Access Network identifier).
58.
    a. If the UE is in an untrusted non-3GPP access network, the PDN GW sends the Binding Acknowledge (BACK) to the UE's remote IP address. I.e. the BACK is at first received by the ePDG and tunnelled from the ePDG to the UE. Based on the destination IP address used in the BACK, the UE is able to detect that it is located in an untrusted non-3GPP access network and that all traffic to the PDN GW has to be tunnelled over the ePDG.
    b. If the UE is in a trusted non-3GPP access network, the PDN GW sends the Binding Acknowledge (BACK) to the UE's local non-3GPP IP address. I.e. the BACK is sent to the UE directly, not over the UE-ePDG tunnel. Based on the destination IP address used in the BACK, the UE is able to detect that it is located in a trusted non-3GPP access network and that all traffic can be sent to the PDN GW directly.

General Issues and Variants of the First Aspect

The signalling flows above are only examples. Other variants are also possible, for example in one variant the Binding Update may be sent separately also without the use of MOBIKE, only with use of simple IKE or in another variant the BU may be also implicitly included in a MOBIKE update message and then the procedure may be not transparent to the ePDG.

EMBODIMENTS OF THE INVENTION

In the "first aspect" section it is assumed that the UE supports Client Mobile IP, e.g. Dual Stack MIPv6 (DSMIPv6), and tunnels a Binding Update to the ePDG. However, not all UEs and not all 3GPP operators (e.g. PDN-GWs of the operator) in the evolved system support DSMIPv6. Then, either the UE cannot send BUs, or the PDN-GW does not allow direct user data tunnelling to the PDN-GW. In this case, DSMIP-BUs are not accepted and no Binding Acknowledge is sent back to the UE.

In case DSMIPv6 is not supported, Network Based Mobility (NBM), e.g. Proxy Mobile IP, provides mobility for UEs. Here, when a UE is doing a handover from one access to another, a Mobility Access Gateway (MAG) is sending Binding Updates on behalf of the UE to the PDN-GW (Local Mobility Anchor, LMA) and the IP address/prefix assigned by the new MAG to the UE after the handover is the same IP address/prefix as the one assigned by the old MAG in the old access network.

When Proxy Mobile IP is used for connectivity to an untrusted access, the MAG functionality is located at the ePDG. The UE is assigned a local IP address/prefix in the untrusted non-3GPP access and has to establish the IKE/IPSec tunnel to the ePDG using the local IP address, assigned to the UE by the access network upon the UE's attachment to the access network. Then, the ePDG sends a Proxy Binding Update to the PDN-GW, including the IP address of the ePDG. The ePDG receives the home IP address/prefix for the UE and provides this home IP address/prefix in the IKE_AUTH configuration payload to the UE, since the UE is to use the home IP address/prefix for establishing communication sessions.

When Proxy Mobile IP is used for connectivity to a trusted access, the MAG is located in the trusted access (e.g. on the access point), and the UE initially uses access specific procedures to establish the connection to the trusted access network. Then, 3GPP-based access authentication (using EAP-AKA) must be performed, and, after successful authentication, the MAG sends a Proxy Binding Update message to the PDN-GW, including an initially assigned IP address/prefix. The PDN-GW sends a BACK to the MAG, including the assigned home IP address/prefix, and the MAG provides said home IP address/prefix to the UE. Said received home IP address/prefix can then be used by the UE for establishing communication sessions.

As already mentioned before, at the beginning the UE does not know whether the received IP address/prefix is assigned from the PDN-GW or locally by the access network. However, the UE needs to know said information in order to appropriately finalize the attachment procedure.

In order to do that, it is not possible to base said determination on the fact of whether or not 3GPP authentication is used. In more detail, in order to access a trusted non-3GPP access and use NBM, 3GPP-based access authentication is required. This means on the other hand that if the UE doesn't perform 3GPP-based access authentication, because PMIP is not enabled in the untrusted access network, NBM can only be used via the ePDG. But when the UE accesses an untrusted non-3GPP access, 3GPP-based access authentication may be used as well. Hence, it follows that from the existence of 3GPP-based access authentication only, it cannot be concluded that the access is trusted.

As already mentioned, if the UE is doing a handover to the non-3GPP access when using NBM, the detection of whether the access is trusted and NBM can be used is no problem. The UE already had the home IP address/prefix before the handover. Thus, the UE can detect the trust relationship from the IP address/prefix assigned in the new access. If the IP address/prefix is the same as the home IP address/prefix, the access is trusted, if the IP address/prefix is different, the access is untrusted and a tunnel to the ePDG must be established in order to have session continuity.

This is not applicable in case of an initial attach of the UE to the non-3GPP access, when the UE does not yet have a home IP address/prefix from the previous access network. When the UE is doing 3GPP-based access authentication and after success gets assigned an IP address/prefix, the UE does not know whether the access is trusted and the IP address/prefix is a home IP address/prefix and can be used for application layer sessions or whether the access is untrusted and the IP address/prefix is a local IP address/prefix and the tunnel to the ePDG must be established.

The present invention provides embodiments in which it is still possible for the UE to determine whether the access network is trusted or not.

Proxy MIPv6 (PMIPv6)

Before specifying the embodiments of the invention in more detail, a brief overview of PMIP is given in the following.

Mobile IP is categorized as host-based (or client-based) mobility management, since the mobility-related signalling is between the host (or client) and the HA. Hence, it is sometimes called Client Mobile IP (CMIP). Another approach, targeting the IP mobility management in limited geographical regions, is managed by the network and therefore is transparent to the MN. This approach is referred as network-based, localized IP mobility.

One main characteristic of network-based mobility is that the access network entities are appropriately configured to detect the MN movement and to exchange information about the current location of the MN, so that the MN does not need to be involved in the mobility process. Therefore, the mobility-related signaling over the wireless interface is avoided. Other advantages of the network-based mobility management are less packet overhead over the air, since no MIPv6 encapsulation is needed, and mobility support for simple IP nodes (i.e., non-MIP-capable nodes). The Internet Engineering Task Force (IETF) organisation is working on such an approach for localized mobility management based on the Mobile IP protocol. Since a network entity is acting as a proxy on behalf of the MN, the protocol is called Proxy Mobile IP (PMIP). There is a variant for IPv6 called PMIPv6 and a variant for IPv4 called PMIPv4. Most of the embodiments of this invention assume PMIPv6 as protocol for network-based mobility management, but the invention is not limited to PMIPv6. It may also be applicable to other network-based mobility management protocols such as PMIPv4. Actually, the invention is not limited to network based mobility, and may also be applied to MNs using a client based mobility scheme.

To provide mobility support to any IPv6 host within a restricted and topologically localized portion of the network and without requiring the participation of the host, proxy mobile IP (PMIP) introduces a new logical entity called Mobile Access Gateway (MAG) which is the proxy mobility agent in the access network which manages the mobility related signaling for a mobile node that is attached to its access link. The MAG is the entity responsible for tracking the mobile node's attachment to the link and for signaling to the mobile node's local mobility anchor. The MAG is usually co-located with the access router (AR) and performs Mobile IPv6 signaling message on behalf of mobile node, e.g. can send BU messages on behalf of a MN. These BU messages are marked with a flag, so that they can be identified as Proxy BU (PBU) messages. Furthermore, PBU messages may contain a Network Access Identifier (NAI) option, a home prefix option, and a timestamp option. The NAI option contains the NAI, which has the form of "username@realm" and which is used to identify a MN. The home prefix option, when used, contains the HoA or home prefix of the MN. In the so-called per-MN-prefix addressing model, every MN has a unique home prefix and the MN's global IP address(es) is configured based on this prefix. The unique home prefix can be used in the PBU messages instead of a HoA. The timestamp option contains the time the PBU has been sent by the MAG and is used by the Local Mobility Anchor (LMA) to identify the freshness of the PBU messages. The sequence number value of the PBU message is ignored by the LMA.

A Local Mobility Anchor (LMA) is the home agent for the mobile node in the Proxy Mobile IPv6 domain. It is the topological anchor point for the mobile node's home prefix and is the entity that manages the mobile node's reachability state. It is important to understand that the LMA has the functional capabilities of a home agent as defined in Mobile IPv6 base specification and with the additional required capabilities for supporting Proxy Mobile IPv6.

When a MN attaches to a new MAG in a trusted access network, it authenticates with the network using the EAP framework and an EAP method such as EAP-AKA. The MAG typically acts as pass-through authenticator and forwards the EAP packets to the AAA server/infrastructure related to the MN. The MN uses a NAI as identifier. If the network authentication is successful, the MAG obtains the MN's profile from the AAA server including the MN's home prefix, allocated at the LMA. The MAG then sends a PBU to the LMA and announces the home prefix to the MN. After the MN authenticates with the AR, it starts the IP configuration, i.e. it configures a link-local (LL) IP address, performs Duplicate Address Detection (DAD) for the LL address by sending a Neighbour Solicitation (NS) message to the solicited-node multicast address of the LL address to be checked. If the procedure is successful, the MN sends Router Solicitation (RS) message to all-routers via a corresponding multicast address and waits for receiving a Router Advertisement (RA). The AR/MAG responds with unicast RA including the MN's home prefix.

Figure 6:
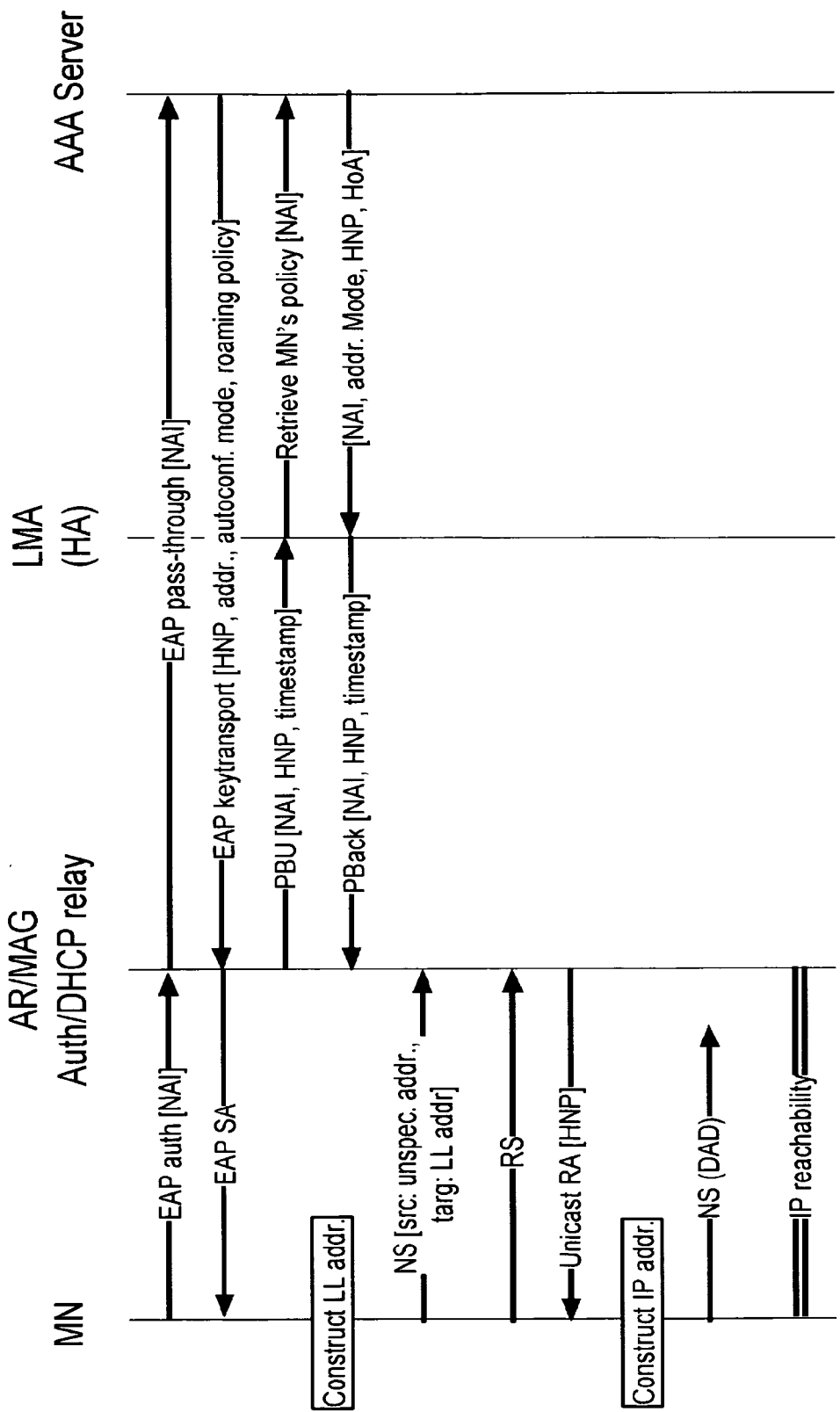
FIG. 6 illustrates a signaling diagram for the initial attach procedure for a MN using PMIPv6.

After configuring a global IP address, the MN is IP reachable and can use the IP address as long as it moves within the PMIP domain. An exemplary signalling flow for PMIPv6 during initial attachment procedure, as described above, is shown in FIG. 6.

Above, a network based mobility scheme has been described in detail, because for the following embodiments of the invention, PMIP is assumed as being used for the UE to allow mobility during communication sessions. However, it should be noted that the invention is not limited thereto, but that the ideas and principles of the various embodiments of the invention can be applied as well when the UE uses client based mobility schemes, such as MIP, on which PMIP is actually partly based.

As has been outlined in the "Summary of Invention" section, one of the main ideas of the invention is to detect the trust relationship of the non-3GPP access by using a security tunnel establishment procedure. In more detail, the UE starts the establishment of the security tunnel and during or after the tunnel establishment, the UE knows about the trust relationship of the non-3GPP access. In one embodiment of the invention, the security tunnel establishment procedure can be the IPsec tunnel using the IKEv2 to negotiate the security associations being used for the IPsec tunnel.

IKEv2 (IPsec)

Before explaining the various embodiments of the invention in more detail, the IPsec (IKEv2) procedure is briefly described.

The Internet Key Exchange (IKE) protocol serves to manage the automated key administration for IPsec. IKE uses the Diffie-Hellman-key exchange for a secure exchange of keys over an insecure computer network. IKE defines how security parameters are agreed upon and how shared keys are to be exchanged. Before the actual start of the encrypted connection via IPsec, both sides need to authenticate each other and agree upon the key-algorithms that are to be used.

Thus, IKE is used to negotiate security associations between a pair of communicating peers. It is defined as part of Internet Protocol Security (IPSec). A Security Association (SA) is an agreement between the two peers and may comprise for example, an identification, the key-algorithm for the IPsec connection and/or from which and to which network the IPsec connection is established.

IKEv2 uses two phases—IKE_SA_INIT and IKE_AUTH—for the negotiation of security associations. Each phase consists of a request and a response; therefore, at least four messages are required to establish the IKE_SA. In the IKE_SA_INIT exchange, the two peers negotiate the use of cryptographic algorithms and exchange information used for key agreement. After this exchange, each peer generates the key material used to derive the shared symmetric keys for authentication and encryption. These keys are associated with the IKE_SA, which is bi-directional. At this point, the two peers have agreed on cryptographic keys but they have not authenticated each other. These keys are used to protect the IKE_AUTH exchange.

The IKE_AUTH exchange is used to provide mutual peer authentication and to establish the security association for the use of IPsec between the two IKEv2 peers. Each peer asserts its identity (e.g., IP address, fully-qualified domain name) and uses an authentication mechanism to prove the assertion. This authentication mechanism may use digital signatures, Extensible Authentication Protocol (EAP), or pre-shared keys. Each peer verifies the other peer's assertion. Once verified, mutual entity authentication is provided. If the verification fails, then the security association negotiation fails and the IKE_SA negotiated in the IKE_SA_INIT exchange is terminated.

The two peers negotiate the cryptographic algorithms to use, what traffic between the peers to protect, and may optionally exchange additional key agreement material in the IKE_AUTH exchange. Certificates may also be exchanged. In this exchange, two unidirectional security associations are created.

Figure 7:
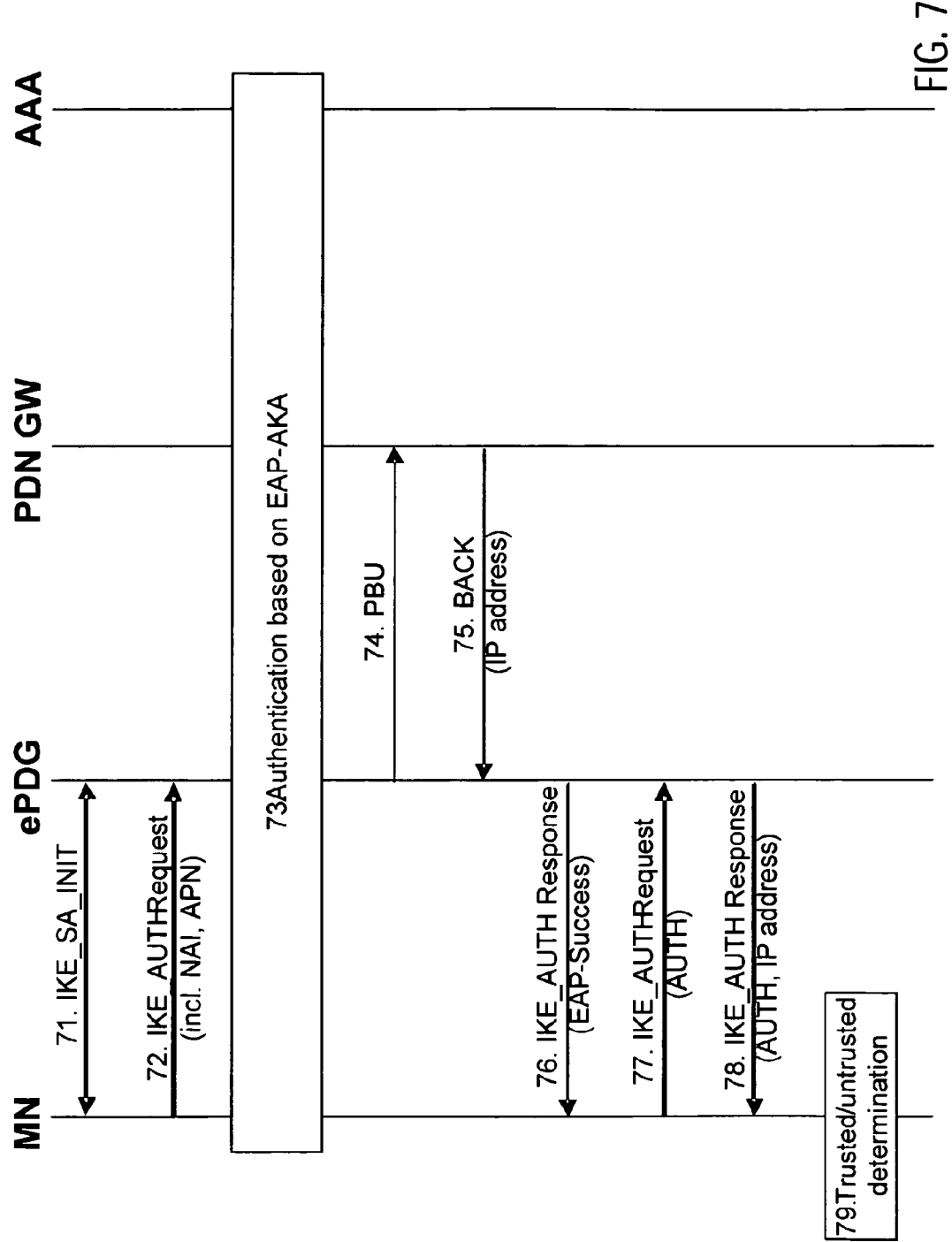
FIG. 7 is an exemplary signalling flow, in which the mobile node performs an IKE-security association exchange with the evolved PDG, according to an embodiment of the invention.

FIG. 7 is a signalling flow in which the procedure for trust detection according to an embodiment of the invention is shown. In this embodiment the UE initiates an IKEv2 procedure with an ePDG so as to acquire the necessary information to determine whether the access network is trusted or not trusted, wherein said determination is performed by the UE itself.

As has been already extensively discussed before, when the UE attaches to a non-3GPP access, it performs at first 3GPP-based access authentication. After successful authentication an IP address/prefix is assigned to the UE, of which the UE does not know whether it can be used for communication sessions or not, i.e. if the access is trusted.

The embodiment of the present invention first proposes to use this IP address/prefix to discover an ePDG, via e.g. DNS (Domain Name resolution). In case of receiving an IP prefix, it would be first necessary that the UE generates an IP address out of the IP prefix, to be able to communicate with the DNS server.

Accordingly, the ePDG is discovered and the UE starts setup of an IKEv2 SA with this ePDG, as will become apparent from below. The following signalling flow is depicted in FIG. 7. The PDN-GW is assumed to be LMA of the UE, and the ePDG is assumed to be the MAG for the UE in case the access network is untrusted.

71. The IKE procedure is initiated by the UE by performing at first the IKE_SA_INIT with the ePDG to establish a secure connection to the ePDG.
72. After successful initiation, in the IKE_AUTH signalling the UE includes its identity (NAI) in the IDi payload and APN information in the IDr payload. Additionally the UE indicates in a configuration payload that it wants to obtain a home IP address/prefix.
73. The ePDG initiates authentication of the UE with the AAA server, wherein EAP-AKA is used.
74. After authentication, the ePDG sends a Proxy Binding Update message to the PDN-GW. The PBU message includes the identity of the UE and the requested APN. According to an advantageous embodiment of the invention, the PBU should be tentative, e.g. indicated by a flag. Then, in case a Binding Cache Entry already exists in the PDN-GW, the PDN-GW (LMA) does not switch the path to the ePDG. This is done, since this IKE procedure is to be merely used for determining the trust relationship of the access network, but not to really establish an IPsec tunnel via which the UE is to be reached. If the PBU is not tentative or similar, the PDN-GW would establish a data path to the UE via the ePDG. Then, in case the UE is in a trusted access network, a direct communication with the UE would be possible, without the detour via the ePDG, and the IPsec tunnel needs to be broken up again.
75. The PDN-GW replies with the allocated home IP address/prefix of the UE in a Proxy Binding Acknowledge.
76. The ePDG informs the UE about the authentication success at step 73.
77. When receiving the EAP success in the IKE_AUTH Response, the UE sends an IKE_AUTH Request to the ePDG with the generated AUTH parameter to authenticate the first IKE_SA_INIT message.
78. The ePDG responds with an IKE_AUTH Response including the generated AUTH parameter to authenticate the second IKE_SA_INIT message and including the allocated home IP address/prefix in a configuration payload.
79. The UE compares the IP address/prefix in the IKE_AUTH Response from the ePDG with the IP address/prefix allocated locally. If the two IP addresses/prefixes match, then it is a trusted access and the UE doesn't need to use the tunnel to the ePDG. If the two IP addresses/prefixes do not match, then it is an untrusted access and the UE needs to use the tunnel to the ePDG for accessing the PDN.

The above exemplary signalling flow presents but a mere possibility on how the ideas and principles of the invention can be applied. Naturally, there are several variants, some of which will be presented below.

For instance, instead of transmitting the received home IP address/prefix with the IKE_AUTH Response message at step 78, the ePDG may already deliver the home IP address/prefix to the UE within the IKE_AUTH Response message of step 76, since the home IP address/prefix is already present in the ePDG at that time.

One further alternative to the above procedure is that the home IP address/prefix, allocated to the UE by the PDN-GW is stored in the AAA (Authentication, Authorization, Accounting)/HSS (Home Subscriber Service) server. Then, the ePDG may be able to acquire the UE's home IP address/prefix during the authentication of step 73. In said case, there is no need for triggering by the IKE procedure the transmission of the PBU by the ePDG to the PDN-GW (see step 74). Accordingly, step 75 would neither be necessary. The ePDG getting the UE's home IP address/prefix during the authentication procedure, can then proceed with transmitting the IKE_ AUTH Response message to the UE, as already depicted in FIG. 7, steps 76-78.

Referring now to still another option regarding to the use of the tentative PDU in step 74 of FIG. 7. Instead of the tentative PDU, the ePDG (MAG) may include the initially received IP address/prefix of the UE in the PBU and may further set the Handover Indicator to "attachment" or "unknown". The PBU is then transmitted to the PDN-GW (LMA), which in turn determines whether said IP address/prefix has already been assigned to the UE by itself. In more detail, in case the access network is trusted, the access point of the access network did contact the PDN-GW upon the UE's attachment, for getting the home IP address/prefix of the UE. Thus, the PDN-GW generated the home IP address/prefix for the UE and stored same in a corresponding table.

When receiving the PBU containing the initially assigned IP address/prefix, the PDN-GW is able to determine that the received IP address/prefix is already allocated to the UE, and may indicate said determination in the Proxy-BACK response to the ePDG: the access network is trusted. Conversely, when the access network is not trusted, the PDN-GW was not initially contacted by the access point in the access network, and thus the IP address/prefix, received within the PBU message, is unknown to the PDN-GW. The PDN-GW thus infers that the UE is in an untrusted network and may additionally allocate a new home IP address/prefix for the UE and transmit same in the Proxy-BACK response to the ePDG.

Resulting from the above, the PDN-GW knows when to switch the tunnel to the ePDG and when not. In detail, in case the PDN-GW determines that the access network is trusted (received IP address/prefix in PBU coincides with a previously allocated IP address/prefix for the UE), no switching of the tunnel to the ePDG is performed. However, in case the PDN-GW determines that the access network is not trusted (the received IP address/prefix is unknown to the PDN-GW), the tunnel might already be switched to the ePDG, since the ePDG must be used by the UE to communicate with the core network (PDN-GW).

As already mentioned before, other entities than the UE may also determine the trust relationship of the access network. The ePDG may know after step 73 or step 75 about the initially assigned IP address/prefix and about the home IP address/prefix of the UE. In more detail, the ePDG knows the initially assigned IP address/prefix from the IKE_SA_INIT message exchange, since the UE communicates with the ePDG based on said initially assigned IP address/prefix (e.g. as source address of the first IKE_SA_INIT message transmitted from the UE to the ePDG). Alternatively, the IP address/prefix can be inserted into a payload field of the IKE_SA_INIT message transmitted from the UE to the ePDG. Furthermore, the ePDG learns the UE's home IP address/prefix during the authentication procedure at step 73 (see alternative above), or with step 75 of FIG. 7.

At said time, the ePDG can compare the two IP address/prefixes, the initially assigned one with the home IP address/prefix, and thus infer whether the access network is trusted or not trusted. Then, in case both IP addresses/prefixes match, the ePDG may include in an IKE_AUTH Response, be it at step 76 or at step 78, a Notify-Payload to inform the UE about the determination result, and thus about the trust character of the access network.

Furthermore, in the previous alternative, when assuming that the ePDG determines that the access network is trusted, the ePDG may inform the UE on that, and further the remaining procedure can be aborted. For instance, steps 77 and 78 would not be performed in case the UE is informed about the determination with the IKE_AUTH_RESPONSE message at step 76. Similarly, steps 74-78 would also not be performed in case the home IP address/prefix is received from the AAA server and the ePDG informs the MN preferably in a message of the authentication procedure.

However, in case the IP addresses/prefixes do not match, the ePDG continues with the procedure and informs via the first (step 76) or last (step 78) IKE_AUTH_RESPONSE message the UE about the new home IP address/prefix assigned by the PDN-GW. Also, in said case no tentative PBU needs to be used with the PDN-GW since the access network is untrusted and the PDN-GW must communicate with the UE via the ePDG anyway.

Alternatively to inform the UE during the IKEv2 signalling to the ePDG, the UE may also detect the trust relationship at some point in time after the tunnel to the ePDG was setup successfully, e.g. by some signalling exchange with the PDN GW or an IKE INFORMATIONAL exchange triggered by the ePDG. In this case the UE would, similar to the procedure above, establish the IKEv2 tunnel to the ePDG and use it at first (untrusted mode), independently of the trust relationship of the non-3GPP access, in order to reduce delay during session start. Then, in case the UE detects at some point in time that the non-3GPP access is trusted, the UE may trigger the network (e.g. in an IKE INFORMATIONAL exchange) to switch the path and not use the ePDG tunnel anymore (trusted mode).

One problem with this optimization is that the UE can not use the same prefix on the one hand in the non-3GPP access as local IP prefix and on the other hand as (home) IP prefix allocated by the ePDG as well. This would cause a conflict in the PDN GW, because the PDN GW can tunnel packets for this prefix only either to the ePDG or to the MAG in the non-3GPP access.

Therefore the IP prefix allocated by the PDN GW over the ePDG as (home) IP prefix should be different from the IP prefix allocated in the non-3GPP access. Then the UE would not detect the trust relationship of the non-3GPP access by comparing the IP addresses/prefixes but by other means as mentioned above, e.g. by direct signalling with the PDN GW or by an IKE INFORMATIONAL exchange.

According to another embodiment of the invention, the IKEv2 procedure can be performed with the PDN-GW, instead of with the ePDG. In this embodiment, it is assumed that the PDN-GW is adapted to accept IKE_SA_INIT messages, which is typically not the case. This is illustrated by means of FIG. 8, which presents a signalling flow, in which the UE performs the determination on whether the access network is trusted or not trusted. In this embodiment of the invention, the necessary information is provided from the PDN-GW directly to the UE, as will be detailed below. Though the ePDG is omitted from FIG. 8, the ePDG is still present. Nevertheless, since the messages are exchanged directly between the UE and the PDN-GW, the ePDG does not participate in the exemplary signalling procedure of FIG. 8.

Similar to before, when the UE attaches to a non-3GPP access it performs at first 3GPP-based access authentication. After successful authentication, an IP address/prefix is assigned to the UE, which may be allocated locally (when the access network is untrusted) or allocated at the PDN-GW (when the access network is trusted and the access point is able to contact the PDN-GW). Using this IP address/prefix the UE uses e.g. DNS to discover an IP address of a PDN-GW (e.g. by constructing a FQDN using the Access Point Name for this PDN). Then, the UE initiates the IKEv2 SA establishment with the PDN-GW, as will become more apparent from below.

81. At first, IKE_SA_INIT is performed to establish a secure connection to the PDN-GW.
82. Then, in the IKE_AUTH signalling the UE includes its identity (NAI) in the IDi payload and APN information in the IDr payload. Additionally, the UE can indicate in a configuration payload the IP address that was allocated locally in the non-3GPP access.

83. The PDN-GW initiates authentication of the UE with the AAA server. EAP-AKA is used.
84. The PDN-GW informs the UE about success of the authentication.
85. After receiving the EAP success in the IKE_AUTH Response, the UE sends an IKE_AUTH Request to the PDN-GW with the generated AUTH parameter to authenticate the first IKE_SA_INIT message.
86. The PDN-GW responds with an IKE_AUTH Response including the generated AUTH parameter to authenticate the second IKE_SA_INIT message and including the allocated home IP address/prefix in a configuration payload.
87. The UE compares the IP address/prefix in the IKE_AUTH Response from the PDN-GW with the IP address/prefix allocated in the non-3GPP access. If the two IP addresses/prefixes match, then it is a trusted access. If the two IP addresses/prefixes do not match, then it is an untrusted access and the UE needs to establish the tunnel to the ePDG for getting PDN connectivity.

The above signalling flow differs from the signalling of FIG. 7 mainly in that the IPsec tunnel establishment procedure is performed with the PDN-GW instead of the ePDG. Since the PDN-GW is the LMA of the UE, no PBU and P-BACK messages are necessary. Furthermore, the PDN-GW holds the home IP address/prefix of the UE, thus no additional signalling (PBU and P-BACK) is necessary to acquire the UE's home IP address/prefix.

Many variants and alternatives, discussed in connection with the embodiment of FIG. 7 are also applicable to the embodiment of FIG. 8. For instance, the UE may be informed of its home IP address/prefix in the IKE_AUTH_RESPONSE message at step 84 instead of at step 86.

Actually, the UE may learn far earlier about the trust property of the access network, as will become apparent from FIG. 9. The signalling flow in FIG. 9 also depicts the steps performed after the trust relationship is determined by the UE, for both cases, trusted and untrusted.

91. The UE sends the IKE_SA_INIT to the PDN GW, which includes the initially allocated IP address/prefix (either in the source address or additionally in a payload of the message).
92. The PDN GW may detect that the UE is in a trusted or untrusted non-3GPP access based on the received IP address/prefix used by the UE, e.g. if the IP address/prefix used was allocated by that PDN-GW it must be a trusted access. Conversely, if the IP address/prefix was not allocated by the PDN-GW the access is untrusted.
93. The PDN GW may include a Notify payload in the IKE_SA_INIT (or IKE_AUTH) Response message to inform the UE that the access is trusted respectively untrusted.
94a. When the UE receives the Notify payload in the IKE_SA_INIT (or IKE_AUTH) Response message with an indication that the non-3GPP access is untrusted, then the UE starts the IKEv2 tunnel establishment procedure to the ePDG.
95a. After successful authentication of the UE, the ePDG sends a PBU to the PDN-GW and receives a PBA with the allocated IP address/prefix.
96a. The setup of the IKEv2/IPSec tunnel is completed.
97a. The ePDG informs the UE about the allocated IP address/prefix in a configuration payload.
98a. The UE can start the application layer session using the home IP address/prefix allocated by the PDN-GW.
94b. When the UE receives the Notify payload in the IKE_SA_INIT (or IKE_AUTH) Response message with an indication that the non-3GPP access is trusted, then the UE stops the IKEv2 procedure and can start its application layer session with the allocated IP address/prefix immediately.

Figure 8:
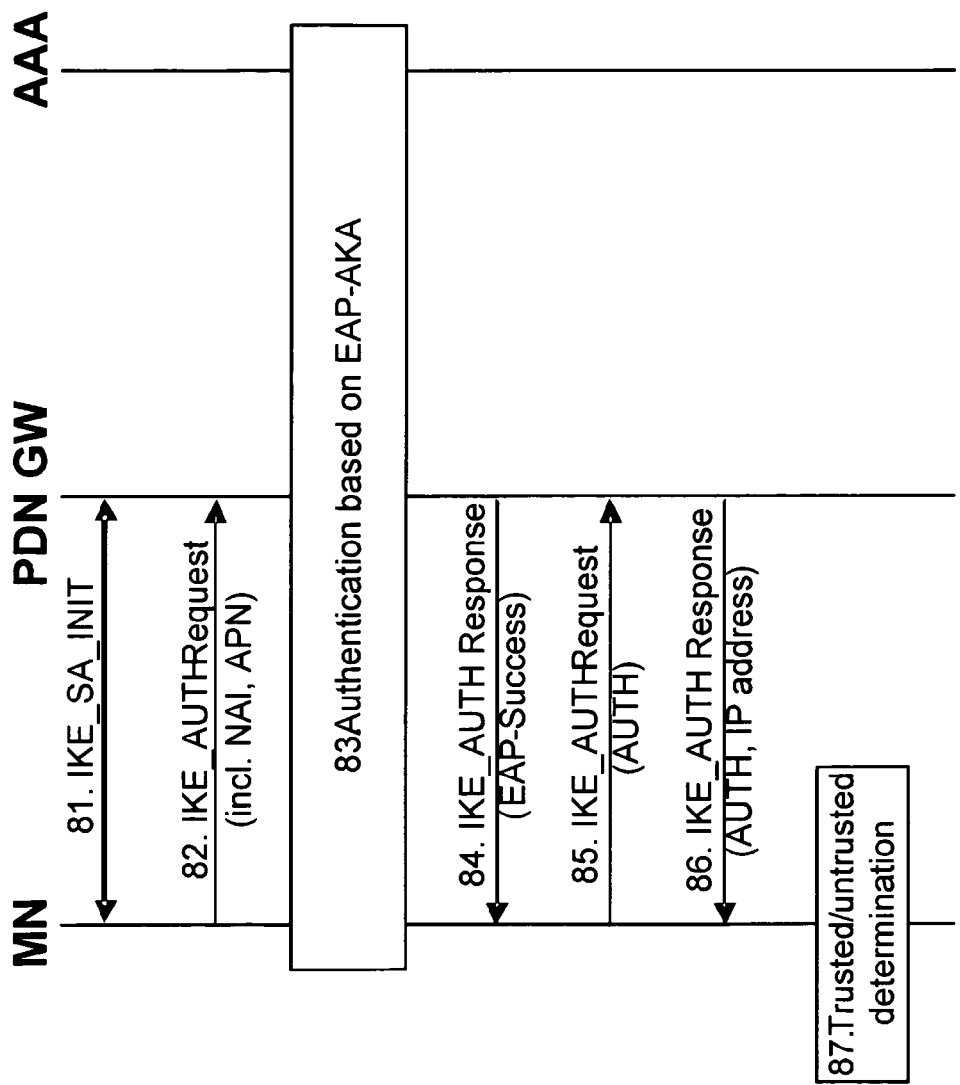
FIG. 8 is an exemplary signalling flow, in which the mobile node performs an IKE-security association exchange with the PDN-GW, according to another embodiment of the invention.

The above described steps 94a-98a and 94b can be applied accordingly to the other embodiments of the invention as reflected in FIGS. 7 and 8 as well.

As mentioned above, the UE initially receives an IP address/prefix with which the IP address of a PDN-GW is discovered using e.g. DNS. In case the non-3GPP access is trusted, the PDN-GW, discovered by the UE, can be different from the PDN-GW that has allocated the IP address/prefix to the UE. In this case the discovered PDN-GW detects that another PDN-GW is in use during the authentication signalling with the AAA server and because of that, the discovered PDN-GW may determine that the UE is in a trusted non-3GPP access. If the discovered PDN-GW is not able to determine whether the UE is in a trusted or untrusted non-3GPP access based on the IP address/prefix, it can trigger the UE within IKEv2 signalling to establish IKEv2 again with the other PDN-GW.

According to still another embodiment of the invention, the trust relationship is determined by the UE without the need of acquiring its home IP address/prefix from the PDN-GW (or the AAA server). In the above embodiments, in which the UE directly contacts with the PDN-GW, it is assumed that the PDN-GW replies to the IKE_SA_INIT sent from the UE. However, the PDN-GW may be configured to not reply to the IKE_SA_INIT messages. In this case, the UE may be notified about unreachability of the PDN-GW's IP address or the IKEv2 SA establishment will fail after a timeout. Then, the UE may assume that it is attached to an untrusted non-3GPP access and continues with the establishment of an IKE/IPSec tunnel to an ePDG.

In order to reduce session setup delay, the UE may start with the tunnel establishment to the ePDG before the unreachability of the PDN-GW is determined, e.g. in parallel to the IKEv2 setup attempt to the PDN-GW. The UE may start a timer after the first IKE_SA_INIT to the PDN-GW, and if the UE did not receive a reply from the PDN-GW before the timer expires, the UE may initiate the IKE_SA procedure with the ePDG in parallel.

In the IKEv2 to PDN-GW embodiments the IKEv2 tunnel is only used for trust relationship detection, i.e. no user data is transferred over the tunnel. If the UE tries to send user data over the tunnel, the PDN-GW may block the packets.

There may be cases where when comparing IP addresses, the included IP prefix of a locally allocated IP address coincides with the included IP prefix of the home address, however the first IP address and home IP address do not coincide, and thus the access network is untrusted.

Another embodiment of the invention relates to the implementation of the various embodiments described above using hardware and software. It is recognised that the various methods mentioned above may be implemented using computing devices (processors), as for example general purpose processors, Digital Signal Processors (DSP), Application Specific Integrated Circuits (ASIC), Field Programmable Gate Arrays (FPGA) or other programmable logic devices, etc. The various embodiments of the invention may also be performed or embodied by a combination of these devices.

Further, the various embodiments of the invention may also be implemented by means of software modules which are executed by a processor or directly in hardware. Also, a combination of software modules and hardware implementation may be possible. The software modules may be stored in any

The invention claimed is:

1. A method for determining a trust relationship between a core network and an access network for a user equipment that attaches to the access network, wherein the core network comprises a gateway and a home agent of the user equipment, the method comprising the steps of:
    allocating a home IP address/IP prefix of the user equipment at the home agent of the user equipment,
    upon attaching to the access network, receiving by the user equipment an IP address/IP prefix, assigned to the user equipment by the access network,
    exchanging messages of a security tunnel establishment procedure, performed between the user equipment and the gateway, the messages including information on at least one of the IP address/IP prefix and the home IP address/IP prefix of the user equipment, and
    after the step of exchanging the messages of the security tunnel establishment procedure, comparing in the gateway or in the user equipment the IP address/IP prefix with the home IP address/IP prefix, and in case they coincide, determining the access network is trusted by the core network, and in case they do not coincide, determining the access network is not trusted by the core network.

2. The method according to claim 1, wherein the security tunnel establishment procedure comprises an authentication procedure, performed between the user equipment, the gateway and an authentication server of the core network,
    wherein the gateway receives the home IP address/IP prefix from the authentication server in a message of the authentication procedure.

3. The method according to claim 1, wherein in case the gateway determines whether or not the access network is trusted by the core network, the result of the determination is transferred to the user equipment within a message of the security tunnel establishment procedure.

4. The method according to claim 1, wherein the gateway is an evolved packet data gateway, and a trusted entity is a packet data network gateway responsible for the user equipment, and wherein:
    the home IP address/IP prefix is transferred from the packet data network gateway to the user equipment, using one of the messages of the security tunnel establishment procedure, and/or to the evolved packet data gateway, within another message triggered by the security tunnel establishment procedure.

5. The method according to claim 4, wherein the IP address/IP prefix is transferred from the user equipment to the evolved packet data gateway within one of the messages of the security tunnel establishment procedure.

6. The method according to claim 4, wherein the security tunnel establishment procedure triggers transmitting a mobility message from the evolved packet data gateway to the packet data network gateway, wherein the mobility message triggers the packet data network gateway to return the home IP address/IP prefix to the evolved packet data gateway.

7. The method according to claim 6, wherein the mobility message, transmitted to the packet data network gateway, includes the IP address/IP prefix, and wherein the packet data network gateway determines whether the IP address/IP prefix, received in the mobility message, has already been assigned to the user equipment by the packet data network gateway, and
    in case it is determined that the IP address/IP prefix, received in the mobility message, is the same as the IP address/IP prefix, assigned to the user equipment upon the user equipment attaching to the access network, the packet data network gateway returns information to the evolved packet data gateway on the result of said determination,
    in case it is determined that the IP address/IP prefix, received in the mobility message, was not assigned to the user equipment by the packet data network gateway upon the user equipment attaching to the access network, the home IP address/IP prefix is generated by the packet data network gateway and is transmitted to the evolved packet data gateway.

8. The method according to claim 1, wherein the gateway and a trusted entity is a packet data network gateway responsible for the user equipment, and wherein
    the home IP address/IP prefix is transferred from the packet data network gateway to the user equipment within one of the messages of the security tunnel establishment procedure, or
    the IP address/IP prefix is transferred from the user equipment to the packet data network gateway within one of the messages of the security tunnel establishment procedure.

9. A user equipment configured to be attached to an access network, and configured to determine a trust relationship between a core network, comprising a gateway and a home agent of the user equipment, and the access network, the user equipment comprising:
    an allocation unit configured to allocate a home IP address/IP prefix of the user equipment at the home agent of the user equipment,
    a receiver configured to receive an IP address/IP prefix, assigned to the user equipment by the access network,
    the receiver and a transmitter being configured to exchange messages of a security tunnel establishment procedure, performed between the user equipment and the gateway, the messages including information on at least one of the IP address/IP prefix and a home IP address/IP prefix of the user equipment, and
    a processor configured to compare the IP address/IP prefix with the home IP address/IP prefix, and in case they coincide, determine that the access network is trusted by the core network, and in case they do not coincide, determine that the access network is not trusted by the core network.

10. A method for trust relationship detection between a core network and an access network for a user equipment connected to the access network, wherein the core network comprises a first gateway and a second gateway, the method comprising the steps of:
    sending by the user equipment a message to the core network via the second gateway;
    deciding whether the user equipment resides in a trusted or a non-trusted access network;
    sending by the first gateway a message to the user equipment via a first tunnel between the first gateway and the user equipment, the first tunnel being tunnelled between the second gateway and the user equipment, if it is decided that the user equipment resides in a non-trusted access network; and
    sending by the first gateway a message to the user equipment via a second tunnel between the first gateway and the user equipment, the second tunnel not being tunnelled between the second gateway and the user equipment, if it is decided that the user equipment resides in a trusted access network.

11. The method according to claim 10 wherein the first gateway is a packet data network gateway, or wherein the second gateway is an evolved packet data gateway.

12. The method according to claim 10 wherein the step of deciding is carried out by the second gateway, or by the first gateway, or by an authentication, authorization and accounting server.

13. The method according to claim 10, wherein the message in the step of sending by the user equipment the message is a binding update, wherein the binding update is tunnelled or included in another message.

14. The method according to claim 10, further comprising the step of:
   sending by the first gateway a binding acknowledgement message to the user equipment at an internet protocol address in the access network if the user equipment resides in a trusted access network, or
   sending by the first gateway a binding acknowledgement message to the user equipment at an internet protocol address at the second gateway if the user equipment resides in a non-trusted access network.

15. The method according to claim 14, further comprising the steps of:
   receiving by the user equipment the binding acknowledgement message;
   determining that the user equipment resides in a trusted network if the internet protocol address in the access network is used; and
   determining that the user equipment resides in a non-trusted network if the internet protocol address at the second gateway is used.

16. A user equipment configured to be connected to an access network, wherein a trust relationship between a core network comprising a first gateway and a second gateway and the access network is detectable, the user equipment comprising:
   a transmission unit configured to send a message to the core network via the second gateway; and
   a reception unit configured to receive a message from the first gateway via a first tunnel between the first gateway and the user equipment, the first tunnel being tunnelled between the second gateway and the user equipment if the user equipment resides in a non-trusted access network,
   wherein the reception unit is further configured to receive a message from the first gateway via a second tunnel between the first gateway and the user equipment if the user equipment resides in a trusted access network.

* * * * *